United States Patent
Maehira

(10) Patent No.: US 8,988,718 B2
(45) Date of Patent: Mar. 24, 2015

(54) METHOD AND PROGRAM FOR PRODUCING PRINTED MATTER

(71) Applicant: Hirotoshi Maehira, Nagoya (JP)

(72) Inventor: Hirotoshi Maehira, Nagoya (JP)

(73) Assignee: Brother Kogyo Kabushiki Kaisha, Nagoya-Shi, Aichi-Ken (JP)

(*) Notice: Subject to any disclaimer, the term of this patent is extended or adjusted under 35 U.S.C. 154(b) by 0 days.

(21) Appl. No.: 14/032,466

(22) Filed: Sep. 20, 2013

(65) Prior Publication Data

US 2014/0085670 A1   Mar. 27, 2014

(30) Foreign Application Priority Data

Sep. 27, 2012 (JP) ................................ 2012-214092

(51) Int. Cl.
  *G06F 3/12*   (2006.01)

(52) U.S. Cl.
  CPC .............. *G06F 3/1296* (2013.01); *G06F 3/121* (2013.01); *G06F 3/122* (2013.01); *G06F 3/1234* (2013.01); *G06F 3/1262* (2013.01); *G06F 3/1292* (2013.01)
  USPC ........ 358/1.15; 358/1.13; 358/1.16; 358/1.17

(58) Field of Classification Search
  CPC ....... G06F 3/121; G06F 3/122; G06F 3/1234; G06F 3/1262; G06F 3/1292; G06F 3/1296
  USPC ................................. 358/1.13–1.17
  See application file for complete search history.

(56) References Cited

U.S. PATENT DOCUMENTS

| 6,293,714 | B2 * | 9/2001 | Noda .............................. 400/61 |
| 7,019,854 | B1 * | 3/2006 | Sawano ....................... 358/1.15 |
| 2002/0089691 | A1 * | 7/2002 | Fertlitsch et al. ............ 358/1.15 |
| 2003/0106637 | A1 * | 6/2003 | Kimble ......................... 156/277 |
| 2006/0092467 | A1 * | 5/2006 | Dumitrescu et al. ......... 358/1.15 |
| 2007/0008580 | A1 * | 1/2007 | Tanaka ......................... 358/1.15 |
| 2010/0064090 | A1 * | 3/2010 | Learmonth et al. .......... 710/316 |
| 2013/0201494 | A1 * | 8/2013 | Sweet et al. ................... 358/1.9 |

FOREIGN PATENT DOCUMENTS

| GB | WO2012056032 | A1 * | 5/2012 | ................ G06F 1/26 |
| JP | 2001-058431 | | 3/2001 | |
| JP | 2003-150367 | | 5/2003 | |
| JP | 2011-193210 | | 9/2011 | |
| JP | 2013-001012 | | 1/2013 | |
| JP | 2013-004063 | | 1/2013 | |

* cited by examiner

*Primary Examiner* — Benny Q Tieu
*Assistant Examiner* — Quyen V Ngo
(74) *Attorney, Agent, or Firm* — McCarter & English, LLP

(57) ABSTRACT

This disclosure discloses a non-transitory computer-readable recording medium, storing a program for executing steps. The steps comprising a first storage processing step for obtaining a plurality of print data, a capacity obtaining step for obtaining a storage capacity of the storage portion of the printed matter producing apparatus, a data allocation step for grouping the plurality of print data into a plurality of print data groups, so that each data volume is not more than the predetermined storage capacity and for determining allocation of the print data to be included in each print data group so that the number of the print data groups becomes the minimum, a second storage processing step for storing the plurality of print data so that they can be read for each print data group, and a first data transmission step for sequentially transmitting the print data to the printed matter producing apparatus.

7 Claims, 17 Drawing Sheets

FIG. 7A    FIRST COMPARATIVE EXAMPLE
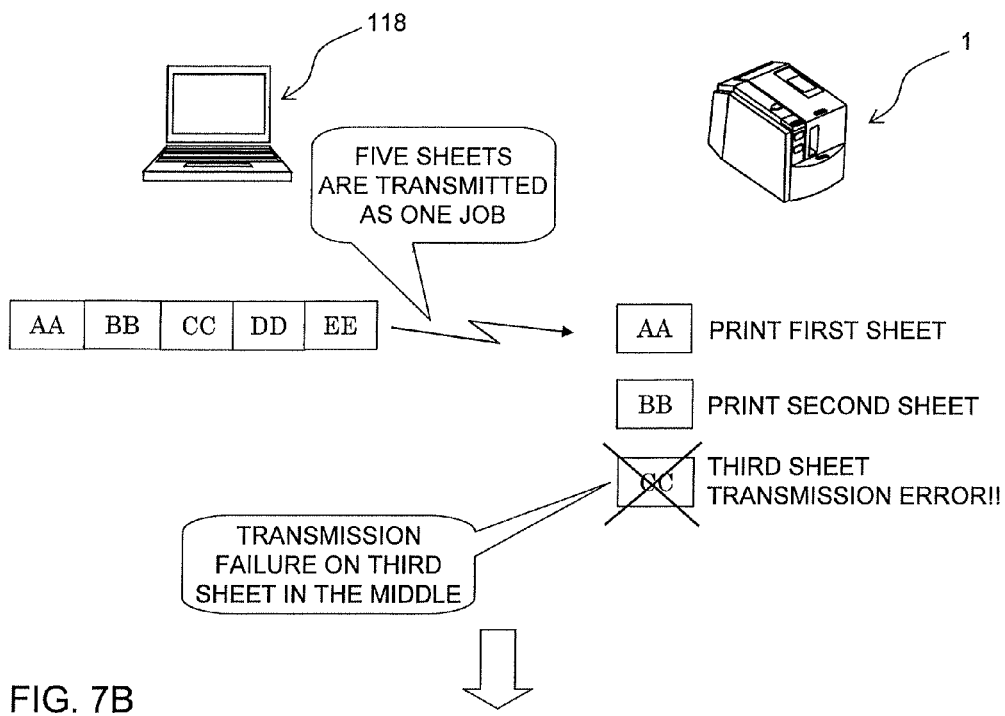
FIG. 7B
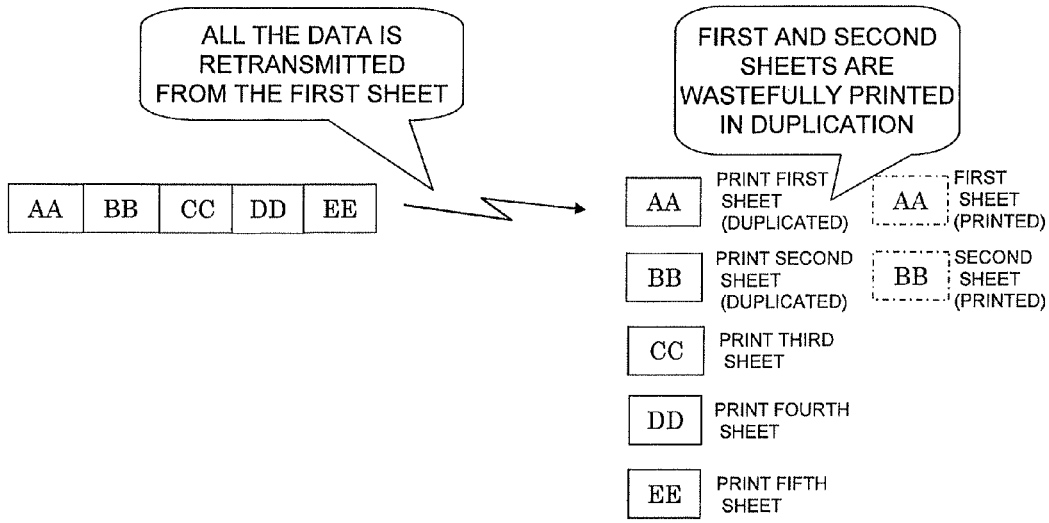

FIG. 8

LABEL PRODUCTION JOB

| PRINT DATA (AA) | CUT -TING FLAG | PRINT START COM -MAND | PRINT DATA (BB) | CUT -TING FLAG | PRINT START COM -MAND | PRINT DATA (CC) | CUT -TING FLAG | PRINT START COM -MAND | PRINT DATA (DD) | CUT -TING FLAG | PRINT START COM -MAND | PRINT DATA (EE) | CUT -TING FLAG | PRINT START COM -MAND |

FIG. 9A  EMBODIMENT
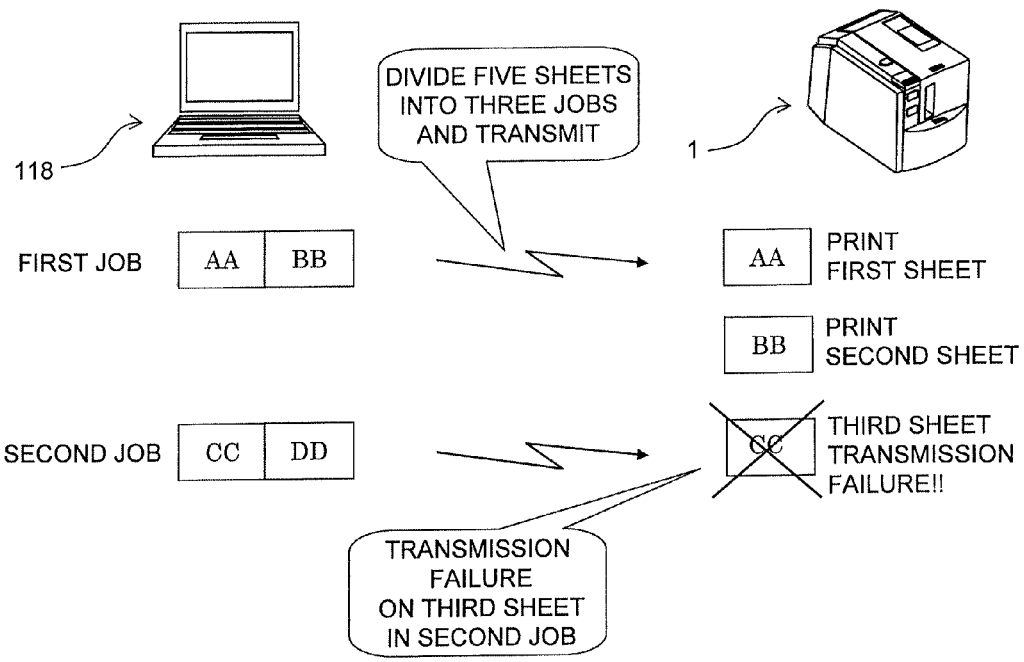
FIG. 9B
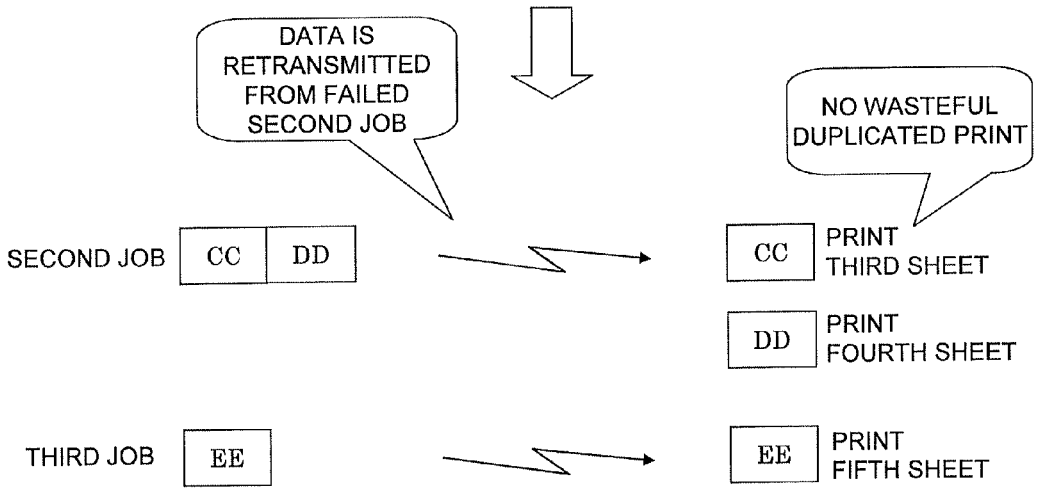

FIG. 10

FIRST LABEL PRODUCTION JOB

| INITIALI-ZATION COMMAND | PRINT DATA (AA) | CUT-TING FLAG | PRINT DATA (BB) | CUT-TING FLAG | PRINT START COM-MAND |
|---|---|---|---|---|---|

SECOND LABEL PRODUCTION JOB

| INITIALI-ZATION COMMAND | PRINT DATA (CC) | CUT-TING FLAG | PRINT DATA (DD) | CUT-TING FLAG | PRINT START COM-MAND |
|---|---|---|---|---|---|

THIRD LABEL PRODUCTION JOB

| INITIALI-ZATION COMMAND | PRINT DATA (EE) | CUT-TING FLAG | PRINT START COM-MAND |
|---|---|---|---|

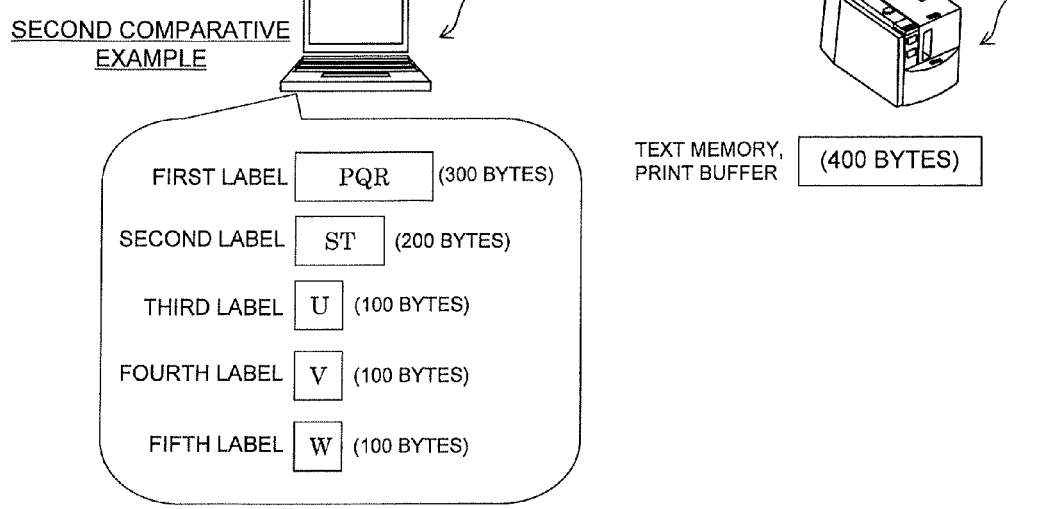
FIG. 11A SECOND COMPARATIVE EXAMPLE
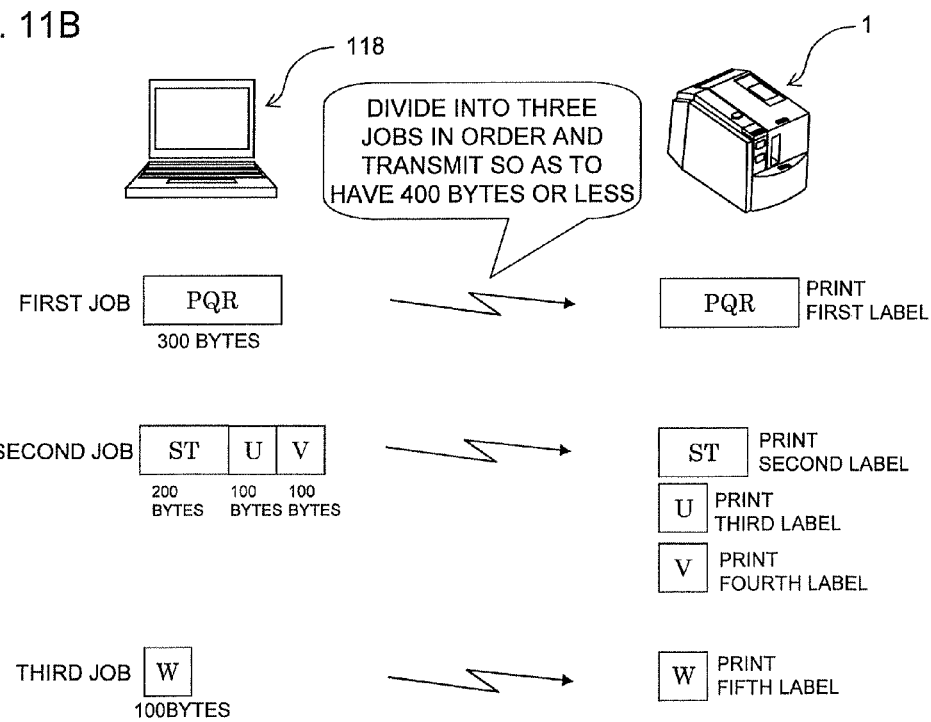
FIG. 11B

FIG. 12A  EMBODIMENT
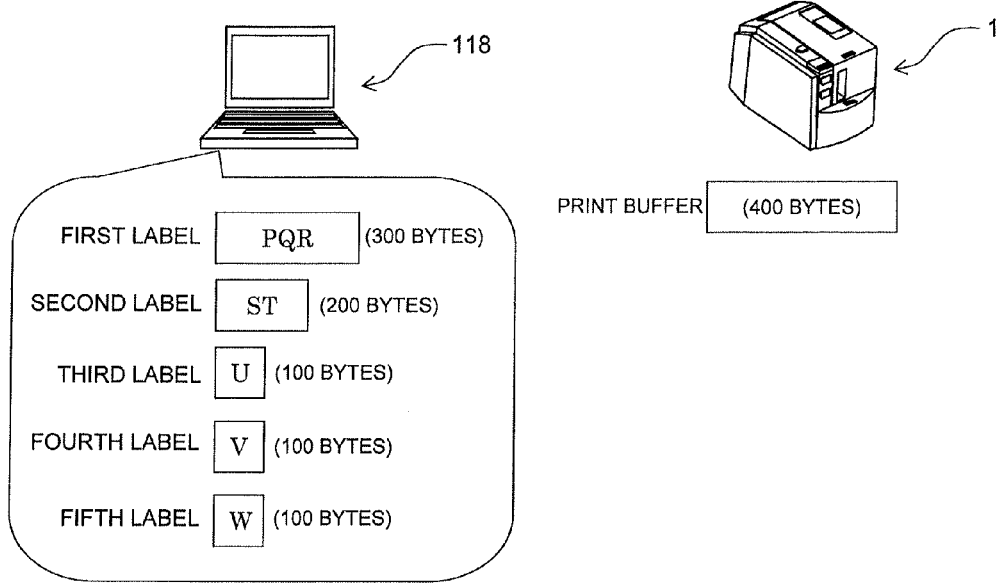
FIG. 12B
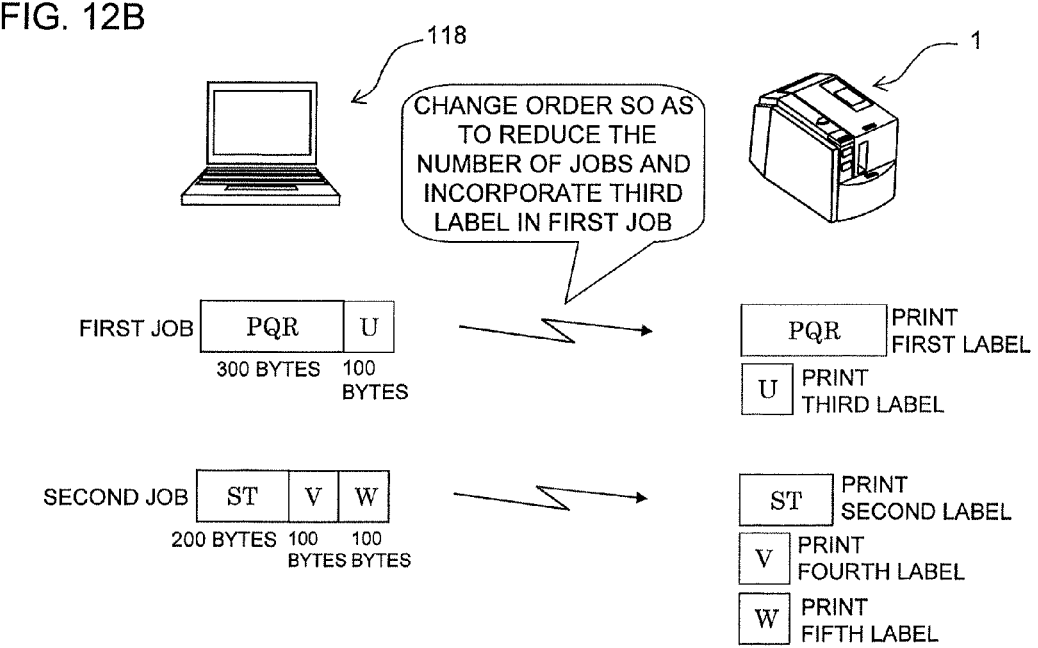

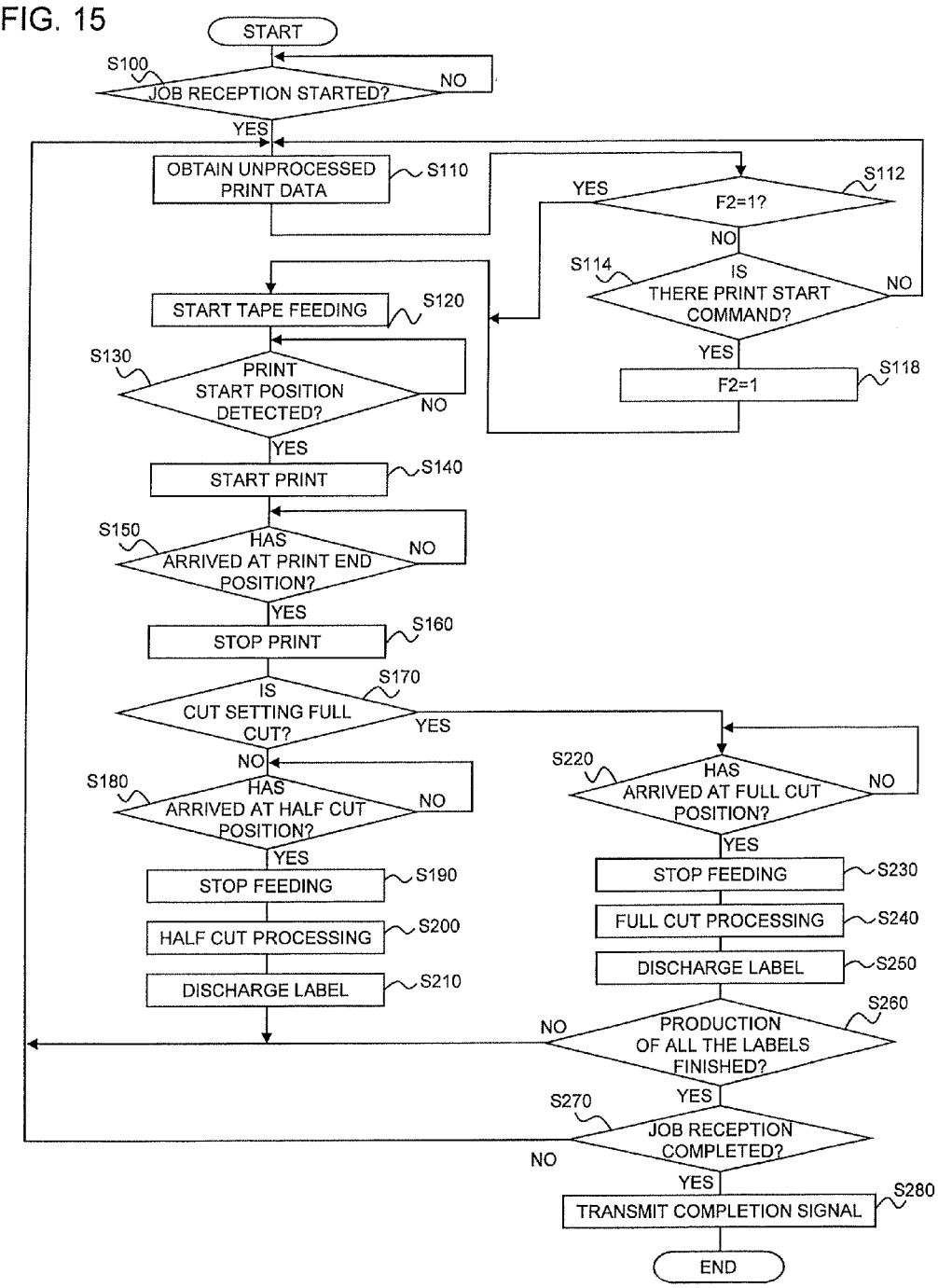

FIRST VARIATION

SECOND VARIATION

METHOD AND PROGRAM FOR PRODUCING PRINTED MATTER

CROSS-REFERENCE TO RELATED APPLICATION

The present application claims priority from Japanese Patent Application No. 2012-214092, which was filed on Sep. 27, 2012, the disclosure of which is incorporated herein by reference in its entirety.

BACKGROUND

1. Field

The present disclosure relates to a non-transitory computer-readable recording medium and a printed matter producing method used in a printed matter producing apparatus.

2. Description of the Related Art

A printed matter producing apparatus which forms a desired print on the basis of print data transmitted from an operation terminal and produces a plurality of printed matters is already known. In this prior art, a plurality of pieces of print data corresponding to a plurality of printed matters, respectively, is transmitted from an operation terminal (print server computer) to a printed matter producing apparatus (digital copying machine) via network communication. The received print data is stored once in storage device (memory) of the printed matter producing apparatus and then, read, and printing device (printer engine) forms the print corresponding to the print data on a print-receiving medium (manuscript).

In the operation, wireless data communication might be disconnected in the middle of transmission of the plurality of pieces of print data for some reasons (hereinafter referred to as communication error as appropriate). If all the plurality of pieces of print data is retransmitted after occurrence of this communication error, even if a part of a printed matter has been already produced by the print data having been normally transmitted before occurrence of the error, all the plurality of printed matters including the part of the printed matter is produced. As a result, the part of the printed matter is produced in duplication, which is a waste.

In response to the above, in the prior art, when a plurality of pieces of print data is to be transmitted to the printed matter producing apparatus for production of a plurality of printed matters as above, the plurality of pieces of print data is divided and grouped into a plurality of print data groups in accordance with storage capacity of the storage device. Then, by sequentially transmitting each of the plurality of print data groups as a printing instruction (print job), if a communication error occurs in the middle of the communication of any of the printing instructions, only printing instructions after the relevant printing instruction will be retransmitted. As a result, the above described waste of duplicated production of the part of printed matter is avoided.

However, in the prior art, when the plurality of pieces of print data is divided and grouped into a plurality of print data groups, there is no particular description on a specific method of sorting in grouping the print data. Usually, the plurality of pieces of print data is generated and arranged according to an order in which a plurality of printed matters is actually produced. Therefore, if grouping is made by simply sorting the data in this aligned order from that with the earlier order so as to be contained in the storage capacity of the storage device, the plurality of pieces of print data which could be combined and grouped into one print data group might be incorporated in separate print data groups, which makes the number of print data groups larger than necessary. Since a print forming operation in the printed matter producing apparatus starts and ends for each print data group, if the number of print data groups becomes excessive as above, the number of times of operation start/operation end becomes large, and continuity of a printed matter producing operation might deteriorate. In the prior art, no particular consideration is given to that point.

SUMMARY

The present disclosure has an object to provide a non-transitory computer-readable recording medium and a printed matter producing method which can improve continuity of the printed matter producing operation while avoiding wasteful duplicated production of the printed matter at a communication error.

In order to achieve the above-mentioned object, according to the aspect of the present application, there is provided a non-transitory computer-readable recording medium, storing a printed matter production program for executing steps on a computing portion provided in an operation terminal for operating, by using wireless data communication, a printed matter producing apparatus that includes a storage portion having a predetermined storage capacity and be configured to store print data, a feeder configured to feed a print-receiving medium, and a print head configured to perform printing on the basis of the print data stored in the storage portion on the print-receiving medium fed by the feeder, the printed matter producing apparatus being configured to continuously produce a plurality of printed matters in which desired print on the basis of the print data is formed, respectively, on the print-receiving medium in a predetermined order along a feeding direction by the feeder, the steps comprising a first storage processing step for obtaining a plurality of pieces of the print data for producing the plurality of printed matters in the predetermined order along the feeding direction, respectively, and for storing the print data in a memory, a capacity obtaining step for obtaining the predetermined storage capacity of the storage portion of the printed matter producing apparatus, a data allocation step for grouping the plurality of pieces of print data stored in the memory in the first storage processing step into a plurality of print data groups, respectively, so that each data volume is not more than the predetermined storage capacity obtained in the capacity obtaining step and for determining allocation of the print data to be included in each print data group so that the number of the print data groups after the grouping becomes the minimum, a second storage processing step for storing, in the memory, the plurality of pieces of print data for which allocation in the data allocation step is finished so that they can be identified and read for each print data group, and a first data transmission step for reading the plurality of pieces of print data stored in the memory in the second storage processing step for each print data group and for sequentially transmitting the print data to the printed matter producing apparatus as a plurality of printing instructions corresponding to the plurality of print data groups, respectively.

BRIEF DESCRIPTION OF THE DRAWING

FIG. 7A is an explanatory diagram for explaining a first comparative example of transmitting a plurality of pieces of print data as one label production job.

FIG. 7B is an explanatory diagram for explaining a first comparative example of transmitting a plurality of pieces of print data as one label production job.

FIG. 8 is an explanatory diagram for explaining a data structure of the label production job in the first comparative example.

FIG. 9A is an explanatory diagram for explaining a method and a principle of an embodiment of the present disclosure.

FIG. 9B is an explanatory diagram for explaining a method and a principle of an embodiment of the present disclosure.

FIG. 10 is an explanatory diagram for explaining the data structure of the label production job.

FIG. 11A is an explanatory diagram for explaining a second comparative example of allocating a plurality of pieces of print data to a plurality of label production jobs in accordance with an order so as to be contained in a storage capacity of the label producing apparatus.

FIG. 11B is an explanatory diagram for explaining a second comparative example of allocating a plurality of pieces of print data to a plurality of label production jobs in accordance with an order so as to be contained in a storage capacity of the label producing apparatus.

FIG. 12A is an explanatory diagram for explaining a method and a principle of the embodiment of the present disclosure.

FIG. 12B is an explanatory diagram for explaining a method and a principle of the embodiment of the present disclosure.

FIG. 15 is a flowchart illustrating control contents of a print label production processing executed by a control circuit of the label producing apparatus.

DETAILED DESCRIPTION OF THE PREFERRED EMBODIMENTS

An embodiment of the present disclosure will be described below by referring to the attached drawings. The present embodiment is an embodiment in which the present disclosure is applied to a production system of a print label.

<System Outline>

Figure 1:
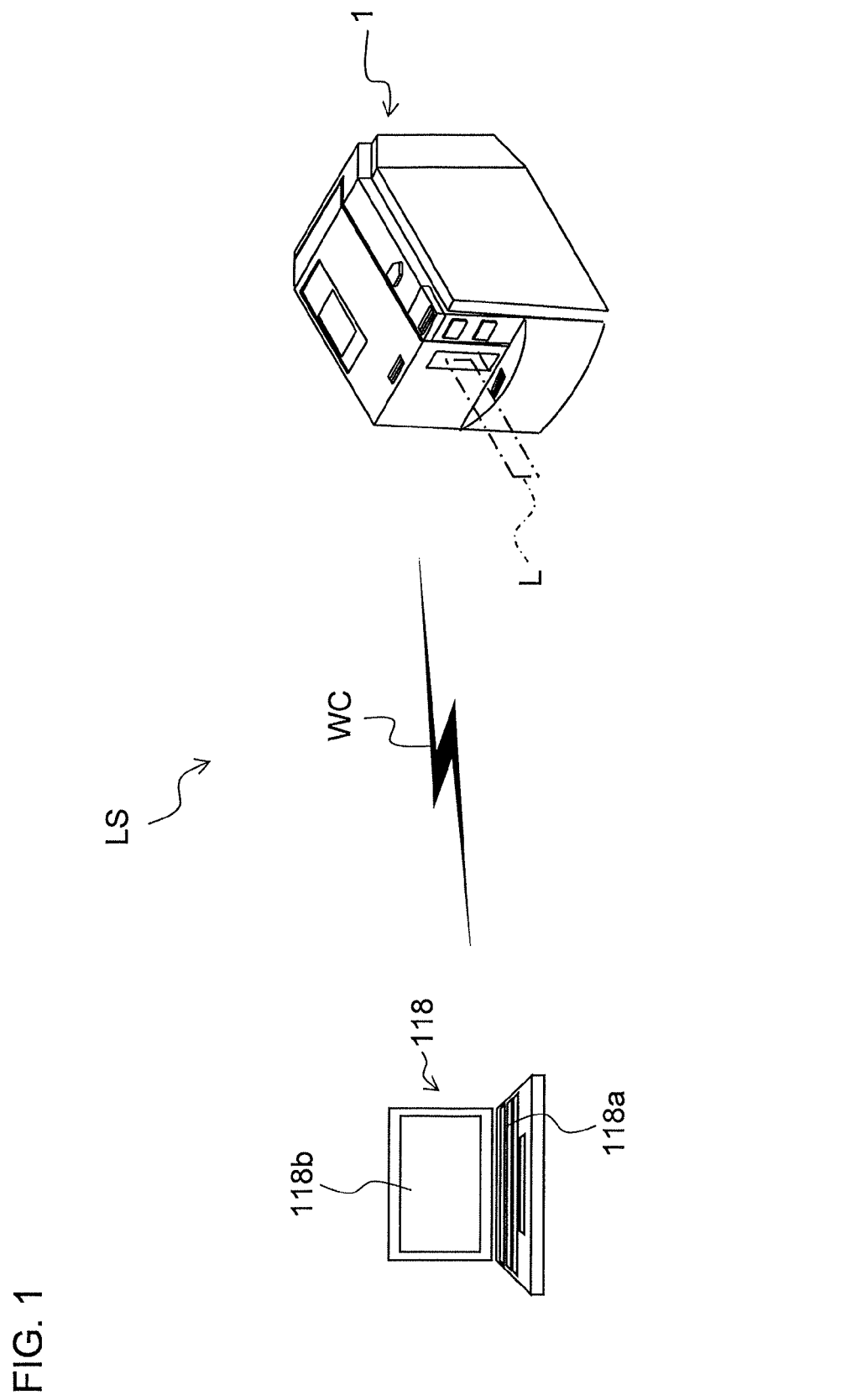
FIG. 1 is a system configuration diagram illustrating a print label production system including a print label producing apparatus operated by an operation terminal of an embodiment of the present disclosure.

A print label production system including a print label producing apparatus which is a printed matter producing apparatus in the present embodiment and a terminal connected to the print label producing apparatus for executing a printed matter producing method in the present embodiment is illustrated in FIG. 1. In this print label production system LS, a print label producing apparatus 1 producing a print label L (corresponding to a printed matter) is connected to a terminal 118 (corresponding to an operation terminal) formed of a general-purpose computer, for example, via wireless data communication WC (including all the wireless communication such as infrared communication in addition to usual wireless communication). The terminal 118 has an operation portion 118a formed of a keyboard or a mouse and the like and a display portion 118b formed of a liquid crystal display and the like, for example.

<Entire Structure of Label Producing Apparatus>

An entire structure of the print label producing apparatus 1 will be described by using FIG. 2.

Figure 2:
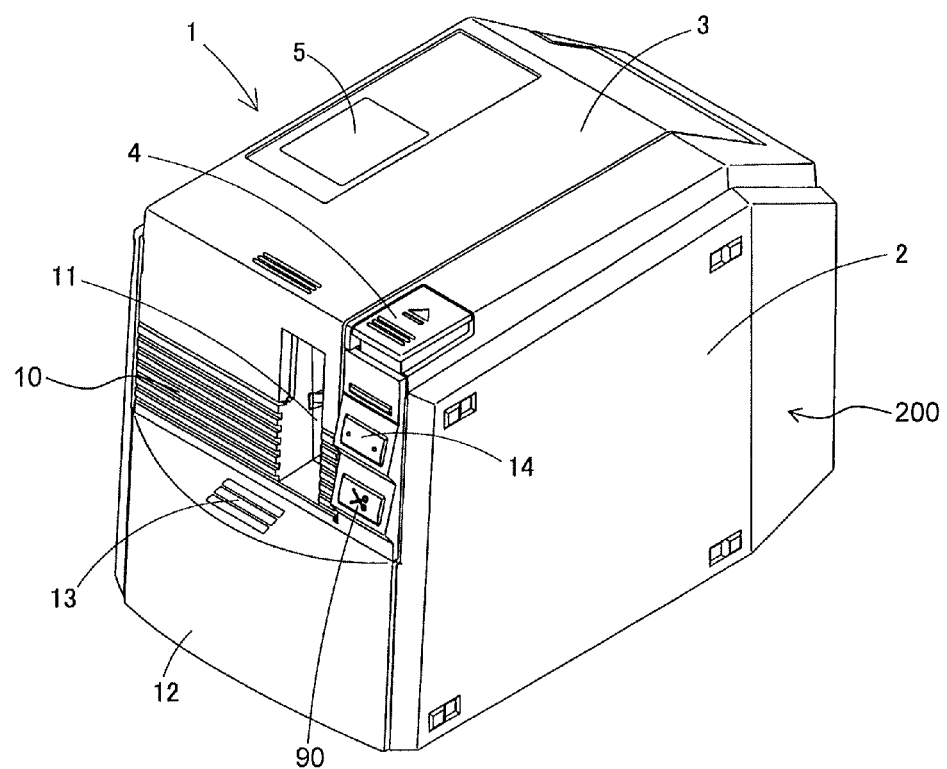
FIG. 2 is a perspective view illustrating an entire construction of the print label producing apparatus.

As illustrated in FIG. 2, the print label producing apparatus 1 has an apparatus main body 2 having a housing 200 as an external enclosure and an opened/closed lid 3 provided on an upper surface of this apparatus main body 2, capable of being opened/closed (or detachable). This housing 200 includes a front wall 10 provided with a label discharging exit 11 through which the print label L produced in the apparatus main body 2 is discharged to the outside and a front lid 12 having a lower end rotatably supported. The front lid 12 includes a pusher portion 13, a power key 14 for turning on/off the print label producing apparatus 1, and a cutter driving key 90 making a cutting mechanism 15 (See FIG. 3 which will be described later) disposed in the apparatus main body 2 capable of being driven by a manual operation of a user. The opened/closed lid 3 opened when an opening/closing button 4 arranged on the upper surface of the apparatus main body 2 is pressed. On the opened/closed lid 3, a transparent window 5 covered by a transparent cover is provided.

<Internal Unit>

Figure 3:
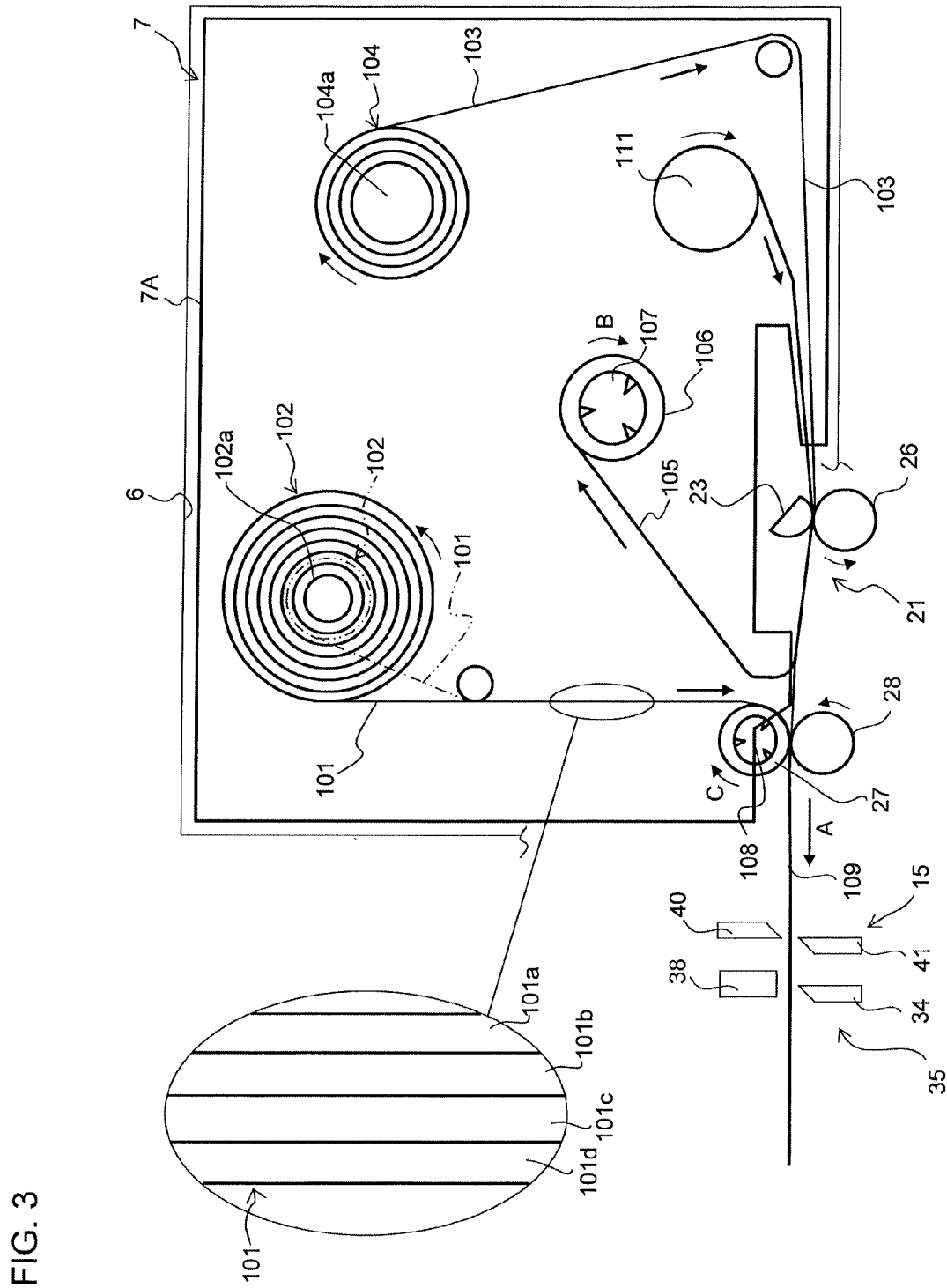
FIG. 3 is an enlarged plan view schematically illustrating an internal unit provided in a housing along with a cartridge.

An internal unit provided in the housing 200 will be described by using FIG. 3. As illustrated in FIG. 3, in the internal unit of the print label producing apparatus 1, there are roughly provided a cartridge holder 6 accommodating a cartridge 7, a printing mechanism 21 provided with a print head 23 (=thermal head) in which a large number of heat generating elements are provided, the cutting mechanism 15 (corresponding to cutter) for fully cutting the print label L by the unit of label production job which will be described later, a half cut unit 35 located on the downstream side in a tape feeding direction of the cutting mechanism 15, and a label discharging mechanism (not shown).

The cartridge 7 has a housing 7A, a first roll 102 arranged in this housing 7A and around which a band-shaped base tape 101 is wound, a second roll 104 around which a transparent cover film 103 having substantially the same width as that of the base tape 101 is wound, a ribbon supply side roll 111 from which an ink ribbon 105 (heat transfer ribbon but not necessary in case of a thermal tape) is fed out, a ribbon take-up roller 106 taking up the ink ribbon 105 after print, and a feeding roller 27 rotatably supported in the vicinity of a tape discharge portion of the cartridge 7. The cover film 103 and a label tape 109 with print with the base tape 101 bonded to the cover film 103 correspond to a print-receiving medium described in each claim.

The first roll 102 has the base tape 101 wound around a reel member 102a. The base tape 101 has a four-layer structure in this example (See a partially enlarged diagram in FIG. 3), and an adhesive layer 101a made of an appropriate adhesive material, a colored base film 101b made of PET (polyethylene terephthalate) or the like, an adhesive layer 101c made of an appropriate adhesive material, and a separation sheet 101d are laminated in this order from the side wound inside the roll (right side in FIG. 3) to the opposite side (left side in FIG. 3). That is, on the front surface side of the base film 101b (right side in FIG. 3), the adhesive layer 101a for bonding the cover film 103 later is formed, and on the back surface side of the base film 101b (left side in FIG. 3), the separation sheet 101d is bonded to the base film 101b by the adhesive layer 101c.

The second roll 104 has the cover film 103 wound around a reel member 104a.

On the other hand, in the cartridge holder 6, a platen roller 26 and a tape pressure roller 28 are rotatably disposed. The platen roller 26 and the tape pressure roller 28 are brought into pressure contact with the print head 23 and the feeding roller 27, respectively. At this time, the feeding roller 27 and the ribbon take-up roller 106 are rotated and driven in an interlocking manner when a feeding roller driving shaft 108 (corresponding to feeder) and a ribbon take-up roller driving shaft 107 are driven. The feeding roller driving shaft 108 and the ribbon take-up roller driving shaft 107 are driven when a driving force of a feeding motor 119 (See FIG. 4 which will be described later) which is a pulse motor, for example, provided outside the cartridge 7 is transmitted through a gear mechanism, not shown. As a result, a feeding driving force is given to the label tape 109 with print and the ink ribbon 105, respectively. As a result, the feeding roller 27 feeds the tape in a direction indicated by an arrow A in FIG. 3 while pressing and bonding the base tape 101 and the cover film 103 in collaboration with the tape pressure roller 28 to form the label tape 109 with print.

The cutting mechanism 15 includes a fixed blade 40 and a movable blade 41. The movable blade 41 is rotated when a driving force of a cutter motor 43 (See FIG. 4 which will be described later) is transmitted. As a result, the movable blade 41 cuts (full cut) all the layers of the label tape 109 with print (the cover film 103, the adhesive layer 101a, the base film 101b, the adhesive layer 101c, and the separation sheet 101d) in a thickness direction in collaboration with the fixed blade 40. As a result, a full cut line CL (See FIG. 5A and the like which will be described later) is formed at a portion which becomes a label rear end portion in the feeding direction.

The half cut unit 35 is arranged such that a receiving base 38 and a half cutter 34 face each other. The half cutter 34 is rotated by a driving force of a half cutter motor 129 (See FIG. 4 which will be described later). As a result, the half cutter 34 cuts (half cut) the layers other than the separation sheet 101d in the thickness direction while leaving the separation sheet 101d in the label tape 109 with print in collaboration with the receiving base 38. As a result, a half cut line HC (See FIG. 5E and the like which will be described later) is formed at a portion which becomes the label rear end portion in the feeding direction. To the contrary to the above, it may be so configured that the half cutter 34 cuts only the separation sheet 101d in label tape 109 with print. In this case, a positional relationship of the half cutter 34 and the receiving base 38 sandwiching the label tape 109 with print in FIG. 3 becomes reversed.

The label discharging mechanism discharges the label tape 109 with print after being fully cut by the cutting mechanism 15 (in other words, the print label L, the same applies to the following) through the label discharging exit 11 (See FIG. 2). This label discharging mechanism has a driving roller 51 (See FIG. 4 which will be described later) rotated by a driving force of a tape discharge motor 65 (See FIG. 4 which will be described later) and a pressure roller (not shown) facing this driving roller 51 while sandwiching the label tape 109 with print.

<Operation of Internal Unit>

In the internal unit with the configuration, when the cartridge 7 is attached to the cartridge holder 6, the cover film 103 and the ink ribbon 105 are sandwiched between the print head 23 and the platen roller 26, and the base tape 101 and the cover film 103 are sandwiched between the feeding roller 27 and the tape pressure roller 28. Then, the ribbon take-up roller 106 and the feeding roller 27 are rotated and driven in synchronization by the driving force of the feeding motor 119 in directions indicated by an arrow B and an arrow C in FIG. 3, respectively. At this time, the above described feeding roller driving shaft 108 is connected to the tape pressure roller 28 and the platen roller 26 by a gear mechanism (not shown), the feeding roller 27, the tape pressure roller 28, and the platen roller 26 are rotated along with driving of the feeding roller driving shaft 108, and the base tape 101 is fed out of the first roll 102 and supplied to the feeding roller 27. On the other hand, the cover film 103 is fed out of the second roll 104. On the back surface of this cover film 103, the ink ribbon 105 driven by the ribbon supply side roll 111 and the ribbon take-up roller 106 is brought into contact by being pressed by the print head 23. Then, power to the plurality of heat generating elements of the print head 23 is turned on by the printhead driving circuit 120 (See FIG. 4 which will be described later). As a result, on the back surface of the cover film 103, a print R (See FIGS. 5A to 5F and the like which will be described later) on the basis of the print data from the terminal 118 is printed in the feeding direction. Then, the base tape 101 and the cover film 103 on which the printing has been finished are bonded by the feeding roller 27 and the tape pressure roller 28 so as to be integrated and formed as the label tape 109 with print and fed to the outside of the cartridge 7 from the tape discharge portion.

Then, the label tape 109 with print bonded together and produced as above is subjected to full cut by the cutting mechanism 15 (or to half cut by the half cut unit 35 as appropriate), and the print label L is produced. This print label L is further discharged through the label discharging exit 11 (See FIG. 2) by the label discharging mechanism after that.

<Control System of Label Producing Apparatus>

Figure 4:
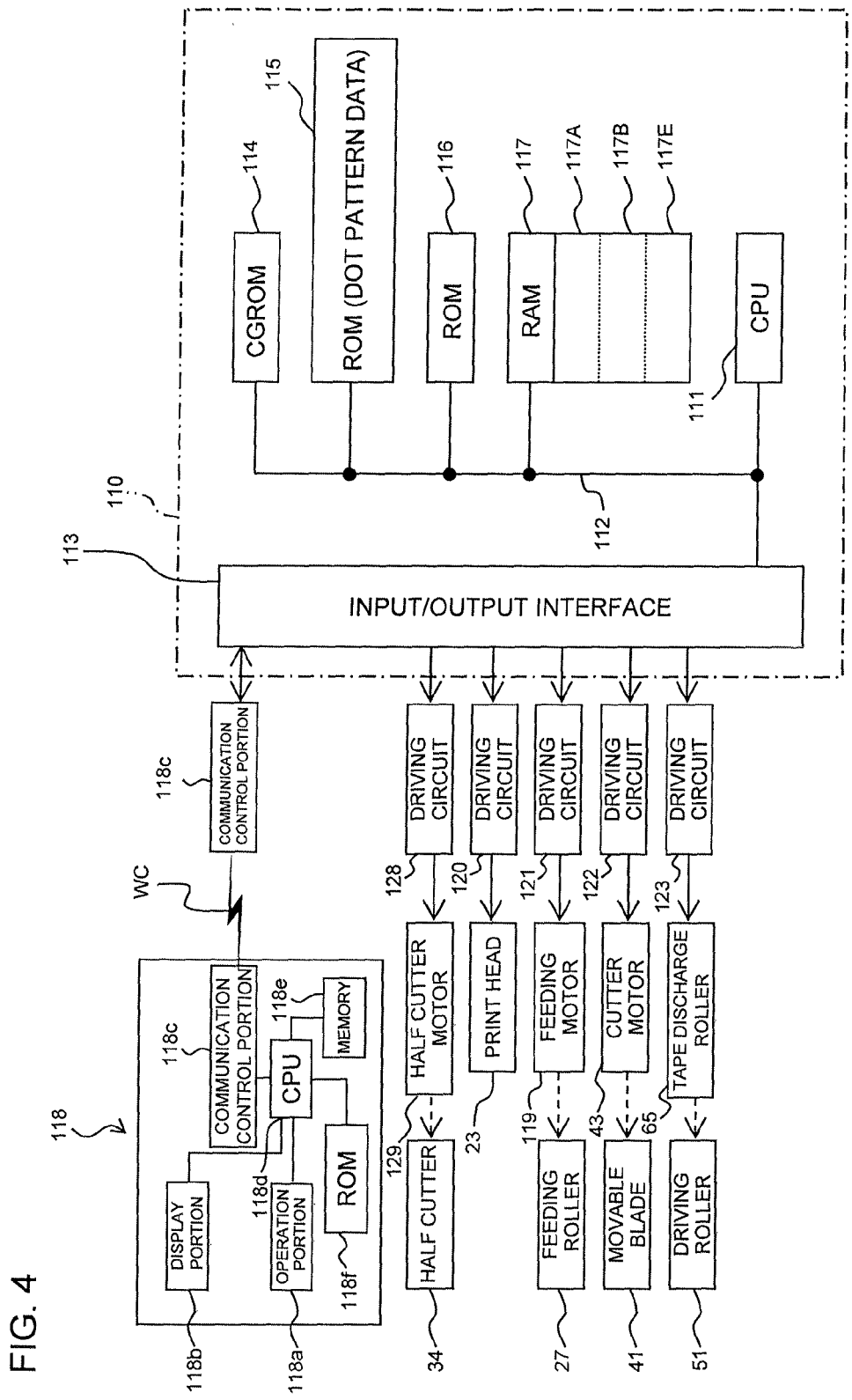
FIG. 4 is a functional block diagram illustrating a control system of the print label producing apparatus.
Figure 5A:
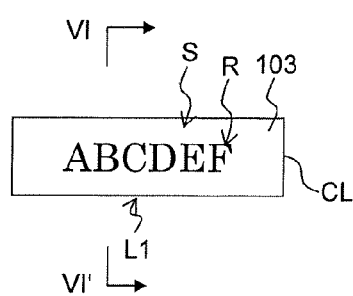
FIG. 5A is a top view illustrating an example of an appearance of a produced label.
Figure 5B:
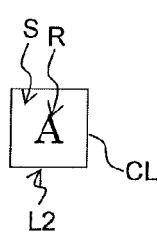
FIG. 5B is a top view illustrating an example of an appearance of a produced label.
Figure 5C:
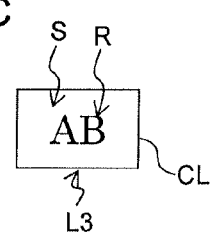
FIG. 5C is a top view illustrating an example of an appearance of a produced label.
Figure 5D:
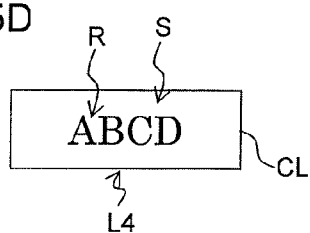
FIG. 5D is a top view illustrating an example of an appearance of a produced label.

A control system of the print label producing apparatus 1 with the configuration will be described by using FIG. 4. On a control board (not shown) of the print label producing apparatus 1, a control circuit 110 illustrated in FIG. 4 is arranged.

In the control circuit 110, a CPU 111 controlling each equipment, an input/output interface 113 connected to this CPU 111 through a data bus 112, a CGROM 114, ROM 115 and 116, and a RAM 117 (details will be described later) are provided.

In the RAM 117, a text memory 117A, a print buffer 117B, a parameter storage area 117E and the like are provided. The text memory 117A and the print buffer 117B accommodate print data input from the terminal 118 and accommodate dot patterns for print, applied pulse number which is an energy amount for forming each dot and the like corresponding to the print data as dot pattern data. The print head 23 performs printing in accordance with the dot pattern data corresponding to the print data stored in this print buffer 117B. In the parameter storage area 117E, various types of calculation data and the like are stored. The text memory 117A and the print buffer 117B correspond to storage portion.

In the ROM 116, printed matter production programs of the present embodiment are stored including a print driving control program, a cutting driving control program, and a tape discharge program and other various programs required for control of the print label producing apparatus 1. The print driving control program is a program for reading the data in the print buffer 117B in correspondence with the print data input from the terminal 118 and driving the print head 23 and the feeding motor 119. The cutting driving control program is a program for feeding the label tape 109 with print to the full cut position (or the half cut position) by driving the feeding motor 119 when printing has been finished and for fully cutting or half-cutting the label tape 109 with print by driving the cutter motor 43 (or the half cutter motor 129). The tape discharge program is a program for forcedly discharging the fully cut label tape 109 with print (=print label L) through the label discharging exit 11 by driving the tape discharge motor 65. The CPU 111 performs various calculations on the basis of the various programs stored in the ROM 116.

To the input/output interface 113, the terminal 118, the print-head driving circuit 120 for driving the print head 23, a feeding motor driving circuit 121 for driving the feeding motor 119, a cutter motor driving circuit 122 for driving the cutter motor 43, a half cutter motor driving circuit 128 for driving the half cutter motor 129, a tape discharge motor driving circuit 123 for driving the tape discharge motor 65, and a communication control portion 124 for conducting both-way wireless data communication WC with the terminal 118 are connected. In this example, the communication control portion 124 is connectable to the terminal 118 or other external devices even via usual wired connection such as a USB cable, and a LAN cable.

On the other hand, the terminal 118 includes the operation portion 118a, the display portion 118b, a communication control portion 118c for conducting both-way wireless data communication WC with the communication control portion 124 of the label producing apparatus 1, a CPU 118d (computing portion), a memory 118e such as the RAM, a ROM 118f, an HDD (not shown) and the like. The CPU 118d executes various programs stored in the HDD in advance by using a temporary storage function of the memory 118e. As a result, the entire print label producing apparatus 1 is controlled. The stored programs include also a program for executing processing such as grouping into a print data group which will be described later, data allocation and the like when a plurality of the print labels L is to be produced by using the print label producing apparatus 1 (printed matter production program. See a flow in FIG. 13 which will be described later). The communication control portion 118c is connectable to the label producing apparatus 1 or other external devices also via usual wired connection such as the USB cable and the LAN cable.

In the control system using such control circuit 110 as a core, a label production job (corresponding to a printing instruction) including the print data from the terminal 118 is input into the control circuit 110 via the wireless data communication WC. Then, on the basis of the control of the CPU 111, the print data included in the label production job is extracted and sequentially stored in the text memory 117A, and a dot pattern corresponding to the print data is extended in the print buffer 117B. Then, the print head 23 is driven through the driving circuit 120, and each of the heat generating elements is selectively heated and driven in correspondence with print dots for one line, and thereby print of the dot pattern data extended in the print buffer 117B is formed. Then, in synchronization with this print formation, tape feeding is performed by the feeding motor 119 through the driving circuit 121.

<Print Label>

An example of the print label L (four types of the print labels L1-L4 in this example) produced by using the label tape 109 with print in the print label producing apparatus 1 on the basis of the label production job from the terminal 118 as above will be described by referring to FIGS. 5A to 5F and FIG. 6.

In each of the print labels L1-L4 illustrated in FIGS. 5A to 5E and FIG. 6, the cover film 103 includes a print area S on which the label print R is to be printed. In each of the print labels L1-L4, the desired label print R on the basis of the print data is printed on the back surface of the cover film 103 in the print area S, respectively.

In FIGS. 5A to 5D, the print labels L1, L2, L3, and L4 individually separated from the label tape 109 with print by the full cut line CL are illustrated, respectively. In the print label L1 illustrated in FIG. 5A, the label print R of "ABCDEF" is printed on the print area S. In the print label L2 illustrated in FIG. 5B, the label print R of "A" is printed on the print area S. In the print label L3 illustrated in FIG. 5C, the label print R of "AB" is printed on the print area S. In the print label L4 illustrated in FIG. 5D, the label print R of "ABCD" is printed on the print area S.

Figure 5E:
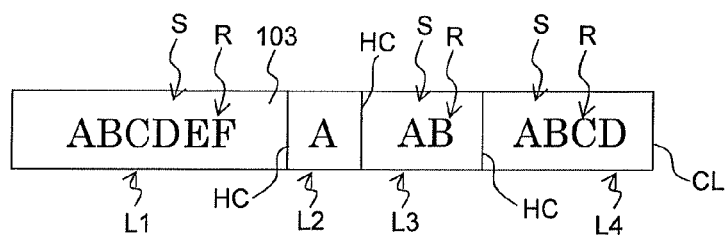
FIG. 5E is a top view illustrating an example of an appearance of a produced label.
Figure 5F:
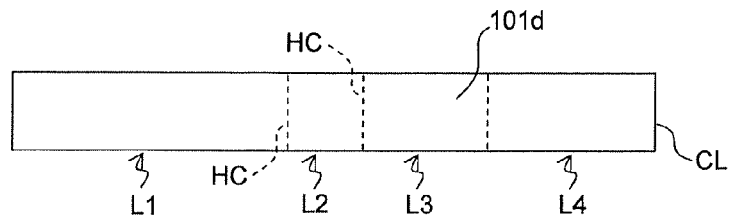
FIG. 5F is a bottom view illustrating an example of an appearance of a produced label.

Moreover, FIGS. 5E and 5F illustrate, unlike the FIGS. 5A to 5D, an example in which a plurality of print labels L is produced in a connected structure through the separation sheets 101d at the half cut lines HC which become respective boundaries. That is, in this example, the print label L1 on which the label print R of "ABCDEF" is formed, the print label L2 on which the label print R of "A" is formed, the print label L3 on which the label print R of "AB" is formed, and the print label L4 on which the label print R of "ABCD" is formed are connected to each other. As described above, the print labels L1-L4 have printed contents different from each other in this example, and the contents of the print data as sources of the printed contents are also different from each other.

Figure 6:
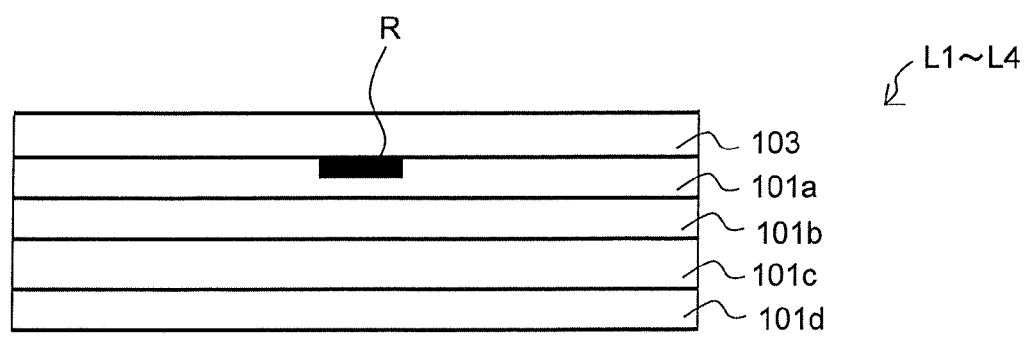
FIG. 6 is a diagram obtained by rotating a cross-sectional view by a VI-VI' section in FIG. 5A in a counterclockwise direction by 90°.

At this time, as illustrated in FIG. 6, each of the print labels L1, L2, L3, and L4 has a five-layer structure in which the cover film 103 is added to the four-layer structure illustrated in FIG. 3 described above. That is, the five layers of cover film 103, the adhesive layer 101a, the base film 101b, the adhesive layer 101c, and the separation sheet 101d are constituted from the cover film 103 side (upper side in FIG. 6) to the opposite side (lower side in FIG. 6).

Features of the Present Embodiment

In the label production system LS having the above described configuration and operations, when a label production job including a plurality of pieces of the print data corresponding to the plurality of labels L is transmitted from the terminal 118 to the label producing apparatus 1 via wireless data communication, the wireless data communication might be disconnected in the middle of the transmission (hereinafter referred to as communication error as appropriate) due to some circumstances such as ambient environment and radio disturbance. Features of the present embodiment are in a processing method in re-transmission of the label production job when the communication error occurs. The details will be described below in order.

(1) Problem when a Plurality of Pieces of Print Data is Transmitted as One Job

First Comparative Example

First, as a first comparative example of the present embodiment, as illustrated in FIG. 7, consider a case in which five pieces of print data for each of five print labels L, that is, the print label L including the label print R of "AA", the print label L including the label print R of "BB", the print label L including the label print R of "CC", the print label L including the label print R of "DD", and the print label L including the label print R of "EE" are transmitted as one label production job.

In the case, as illustrated in FIG. 7A, the above described one label production job includes the five pieces of print data (the print data of "AA", "BB", "CC", "DD", and "EE") for five sheets of labels in this order. FIG. 8 illustrates an example of a data structure of the label production job at this time.

In FIG. 8, in this example, the label production job includes the five pieces of print data, a print start command for causing the print head 23 to start print formation on the basis of each print data, and a cutting flag (corresponding to a cutting instruction) for performing full cut of the label tape 109 with print by the cutting mechanism 15.

That is, first, the print data of "AA" corresponding to the label print R of the first print label L, the cutting flag corresponding to this print data, and the print start command corresponding to the print data are included. Similarly, after that, the print data of "BB" corresponding to the label print R of the second print label L, the cutting flag corresponding to this print data, and the print start command corresponding to the print data are included. Moreover, after that, the print data of "CC" corresponding to the label print R of the third print label L, the cutting flag corresponding to this print data, and the print start command corresponding to the print data are included. Furthermore, after that, the print data of "DD" corresponding to the label print R of the fourth print label L, the cutting flag corresponding to this print data, and the print start command corresponding to the print data are included. Furthermore, after that, the print data of "EE" corresponding to the label print R of the fifth print label L, the cutting flag corresponding to this print data, and the print start command corresponding to the print data are included. In the case of the configuration in which the adjacent print labels L are connected by the above described half cut line HC, a half cutting flag for performing half cut of the label tape 109 with print by the half cutter 34 is incorporated (not shown).

Returning to FIG. 7A, in the print label producing apparatus 1 which started reception of the label production job, when the first print data of "AA" included in the label production job is received in accordance with the order of reception, the first sheet of the print label L including the label print R "AA" is produced. Subsequently, when the second print data of "BB" included in the label production job is received, the second sheet of the print label L including the label print R "BB" is produced. Similarly, the third, fourth, and fifth sheets of the print labels L are produced in accordance with the third, fourth, and fifth print data.

Here, as described above, assume that a communication error occurred, for example, during transmission of the third print data "CC" included in the label production job from the terminal 118 due to some circumstances such as ambient environment and radio disturbance (See FIG. 7A). At occurrence of this error in this comparative example, a new label production job including five pieces of the print data (print data of "AA", "BB", "CC", "DD", and "EE") corresponding to the five sheets of the print labels L as described above is retransmitted from the terminal 118 to the print label producing apparatus 1.

As a result, as illustrated in FIG. 7B, in the print label producing apparatus 1 which started reception of the new label production job, the first sheet of the print label L corresponding to the first print data "AA", the second sheet of the print label L corresponding to the second print data "BB", and similarly the third, fourth, and fifth sheets of the print labels L corresponding to the third, fourth, and fifth print data are produced in accordance with the order of reception. As a result, even though the first sheet of the print label L corresponding to the print data "AA" and the second sheet of the print label L corresponding to the print data "BB" in the five sheets of the print labels L have been already produced by the print data "AA" and the print data "BB" having been normally transmitted until occurrence of the communication error, all the five sheets of the print labels L including also the two sheets of the print labels L are newly produced. As a result, the first sheet of the print label L and the second sheet of the print label L are produced in duplication, which is a waste.

Method and Principle of the Present Embodiment (1)

Thus, in the present embodiment, instead of incorporating the five pieces of the print data "AA", "BB", "CC", "DD", and "EE" corresponding to the label prints R of the first to fifth sheets of the print labels L, respectively, as described above in one label production job, the five pieces of the print data are grouped into a plurality of (three in this example) print data groups. Then, each of the print data groups is transmitted from the terminal 118 to the label producing apparatus 1 in a state of being incorporated in one label production job, respectively. In the grouping, the five pieces of the print data are divided so that a data amount of each print data group is not larger than storage capacities of the text memory 117A and the print buffer 117B of the print label producing apparatus 1. Specifically, as illustrated in FIGS. 9A and 9B, a first label production job includes the first two pieces of the print data (print data "AA" and "BB") in the five pieces of the print data for the five sheets. Moreover, a second label production job includes the subsequent two pieces of the print data (print data "CC" and "DD") in the five pieces of the print data for the five sheets. Then, a third label production job includes the remaining one piece of the print data (print data "EE") in the five pieces of the print data for the five sheets.

FIG. 10 illustrates an example of data structures of the three label production jobs grouped and produced as above. In FIG. 10, in this example, each of the three label production jobs (first to third label production jobs) includes an initialization command for initializing data stored (in advance) in the text memory 117A and the print buffer 117B, all the print data included in the print data group allocated to the label production job, the cutting flag associated with each print data similarly to the above, and the print start command singularly incorporated at the end of the label production job in common to each of the print data.

That is, the first label production job includes the initialization command, the print data "AA" corresponding to the label print R of the first sheet of the print label L, the cutting flag corresponding to this print data, the print data "BB" corresponding to the label print R of the second sheet of the print label L, the cutting flag corresponding to this print data, and the one print start command common to the two print data. Moreover, the second label production job includes the initialization command, the print data "CC" corresponding to the label print R of the third sheet of the print label L, the cutting flag corresponding to this print data, the print data "DD" corresponding to the label print R of the fourth sheet of the print label L, the cutting flag corresponding to this print data, and the one print start command common to the two print data. The third label production job includes the initialization command, the print data "EE" corresponding to the label print R of the fifth sheet of the print label L, the cutting flag corresponding to this print data, and the one print start command. Similarly to the above, in the case of the configuration in which the adjacent print labels L are connected by the above described half cut line HC, instead of the cutting flag, a half cutting flag for performing half cut of the label tape 109 with print by the half cutter 34 is incorporated (not shown).

Returning to FIG. 9A, in the print label producing apparatus 1 which receives the first to third label production jobs, production of the print label L corresponding to each of the label production jobs is sequentially performed. That is, after reception of the first label production job is started, the first print data "AA" included in the first label production job is received, and when the subsequent print data "BB" included in the first label production job is further received, the first and second sheets of the print labels L including the label prints R with "AA" and "BB" are produced. Subsequently, after reception of the second label production job is started, the first print data "CC" included in the second label production job is received, and when the subsequent print data "DD" included in the second label production job is further received, the third and fourth sheets of the print labels L including the label prints R with "CC" and "DD" are produced. Then, reception of the third label production job is started, and when the print data "EE" included in the third label production job is received, the fifth sheet of the print label L including the label print R "EE" is produced.

As described above, in the present embodiment, the three print data groups are divided into the first to third label production jobs and sequentially transmitted, for example. As a result, as illustrated in FIG. 9A, if a communication error occurs in the middle of transmission of the print data "CC" included in the second label production job similarly to the above, for example (not the first label production job in which transmission has been already completed and label production has been normally completed), the second label production job in which the error occurred is retransmitted to the print label producing apparatus 1 from the terminal 118.

As a result, as illustrated in FIG. 9B, in the print label producing apparatus 1 which started reception of the second label production job retransmitted as above, the third sheet of the print label L corresponding to the print data "CC" included in the second label production job and the fourth sheet of the print label L corresponding to the subsequent print data "DD" are produced. Subsequently, when the third label production job is received, the fifth sheet of the print label corresponding to the print data "EE" included in the third label production job is produced. As a result, the waste of duplicated production of a part of (the first sheet and the second sheet in the above described example) print labels L occurred in the above described comparative example is avoided.

(2) Problem when a Plurality of Pieces of Print Data is Divided into a Plurality of Jobs and Transmitted According to the Order In the example, contents of the print data of the five sheets of the first to fifth print labels L are all two text characters, and a data amount of each print data is substantially equal to each other. Therefore, if they are grouped into a plurality of print data groups as described above, it is only necessary to simply allocate them to each of the print data groups in accordance with the order with which the print data is produced ("AA"→"BB"→"CC"→"DD"→"EE" in the example). However, if data amounts of the print data of the respective plurality of the print labels L are varied, the above simple allocation method as above might not be necessarily sufficient.

Second Comparative Example

From the above point of view, first, as another comparative example (second comparative example) of the present embodiment, as illustrated in FIG. 11A, assume that print data for producing the print label L including the label print R "PQR" (its data volume is 300 bytes, for example), print data for producing the print label L including the label print R "ST" (its data volume is 200 bytes, for example), print data for producing the print label L including the label print R "U" (its data volume is 100 bytes, for example), print data for producing the print label L including the label print R "V" (its data volume is 100 bytes, for example), and print data for producing the print label L including the label print R "W" (its data volume is 100 bytes, for example) are produced in this order in the terminal 118 and arranged. The storage capacities of the text memory 117A and the print buffer 117B at this time are 400 bytes, for example.

In the case, in the present comparative example, as illustrated in FIG. 11B, the print data is grouped into a plurality of print data groups simply in accordance with the arrangement order of the print data, and the label production jobs are allocated. That is, the storage capacities of the text memory 117A and the print buffer 117B are 400 bytes, and the data volume of the print data of the first sheet of the print label L including the label print R "PQR" is 300 bytes, and the data volume of the print data of the second sheet of the print label L including the label print R "ST" is 200 bytes. As a result, the total of the data volumes of the two print data is 500 bytes, which exceeds the 400 bytes. Thus, in the first label production job, only the print data of the first sheet of the print label L including the label print R "PQR" is incorporated.

Subsequently, since the data volume of the print data of the second sheet of the print label L including the label print R "ST" is 200 bytes, the data volume of the print data of the subsequent third sheet of the print label L including the label print R "U" is 100 bytes, and moreover, the data volume of the print data of the subsequent fourth sheet of the print label L including the label print R "V" is 100 bytes, the print data of the second, third, and fourth sheets of the print labels L, that is, three sheets in total including the label print R "ST", the label print "U", and the label print "V" are incorporated in the subsequent second label production job.

Subsequently, since the data volume of the print data of the subsequent fifth sheet of the print label L including the label print R "W" is 100 bytes, the print data of the fifth sheet of the print label L including the label print "W" is incorporated in the subsequent third label production job. As a result, the label production jobs are the first label production job, the second label production job, and the third label production job, that is, the three jobs in total, and the number of label production jobs becomes larger.

Method and Principle of the Present Embodiment (2)

Thus, in the present embodiment, in the grouping, instead of sequentially allocating the five pieces of print data of the first to fifth sheets of the print labels L to the label production jobs as described above, allocation is devised so that the number of pieces of the print data groups (in other words, the number of label production jobs) becomes as small as possible by giving consideration to the respective data volumes.

Specifically, as illustrated in FIG. 12B, similarly to the above, first, the print data of the first sheet of the print label L including the label print R "PQR" (data volume is 300 bytes) is incorporated in the first label production job and then, the print data of the third sheet of the print label L including the label print R "U" (data volume is 100 bytes) matching the data volume of 100 bytes remaining when comparing with the storage capacities (400 bytes) of the text memory 117A and the print buffer 117B is also incorporated in the first label production job.

Subsequently, the remaining print data of the second sheet of the print label L including the label print R "ST" (data volume is 200 bytes), the print data of the fourth sheet of the print label L including the label print R "V" (data volume is 100 bytes), and the print data of the fifth sheet of the print label L including the label print R "W" (data volume is 100 bytes) are incorporated in the second label production job. The total of the data volumes of these three pieces of print data just matches the storage capacities of the text memory 117A and the print buffer 117B (400 bytes). As the result, the label production job includes two label production jobs, that is, the first label production job and the second label production job, and the number of label production jobs is reduced. In the first label production job, instead of the print data of the third sheet of the print label L including the label print R "U", the print data of the fourth sheet of the print label L including the label print R "V" (data volume is 100 bytes) or the print data of the fifth sheet of the print label L including the label print R "W" (data volume is 100 bytes) may be incorporated.

As the result of the allocation, as illustrated in FIG. 12B, in the print label producing apparatus 1, first, when the first label production job is received, the first sheet of the print label L corresponding to the print data "PQR" and the third sheet of the print label L corresponding to the print data "U" included in the first label production job are produced. Subsequently, when the second label production job is received, the second sheet of the print label L corresponding to the print data "ST", the fourth sheet of the print label L corresponding to the print data "V", and the fifth sheet of the print label L corresponding to the print data "W" included in the second label production job are produced.

As described above, in the present embodiment, when the plurality of pieces of print data is allocated to the plurality of print data groups in order to avoid a waste of duplicated production of the print labels L as described above, allocation of the print data is determined so that the number of print data groups (in other words, the number of label production jobs) becomes the minimum while the total of the data volumes of the label production jobs is not more than the storage capacities of the text memory 117A and the print buffer 117B. As a result, the number of the entire print data groups (the number of label production jobs) can be suppressed so as not to increase as much as possible. As a result, continuity of the producing operation of the print label L in the print label producing apparatus 1 described above can be improved.

<Control Contents of Operation Terminal>

Processing executed by the CPU 118d of the terminal 118 in order to realize the method of the present embodiment with the above described contents will be described by using flowcharts in FIGS. 13 and 14.

First, at Step S10, the CPU 118d initially sets a variable N indicating the order of the label production job to one and initializes a wireless flag F1 indicating wireless connection to zero.

Subsequently, at Step S11, the CPU 118d determines whether or not connection is made via wireless data communication with the print label producing apparatus 1 or via wired communication with the print label producing apparatus 1 in the communication control portion 118c. Specifically, it is only necessary to make the determination on the basis of a Mac address used in connection with the print label producing apparatus 1 in the communication control portion 118c, for example. If connection is made with the print label producing apparatus 1 via wired communication, the determination at Step S11 is not satisfied (S11: NO), and the routine proceeds to Step S13 which will be described later. If connection is made with the print label producing apparatus 1 via wireless data communication, the determination at Step S11 is satisfied (S11: YES), and the routine proceeds to Step S12. This Step S11 corresponds to a determination step described in each claim.

At Step S12, the CPU 118d sets the wireless flag F1 to one. Subsequently, the routine proceeds to Step S13.

At Step S13, the CPU 118d receives an editing operation of the contents of print formation of the print label L through operation by an operator of the operation portion 118a as appropriate. In this case, the print data corresponding to each print of the print labels L in number of sheets desired by the operator is produced at this point of time by an input of the operator and at the same time, the print contents of the print label L (in other words, type, application and the like of the label) and the order of print formation of each print label L in the feeding direction on the label tape 109 with print (that is, arrangement and alignment order of the print data) are determined.

Subsequently, the routine proceeds to Step S14, and the CPU 118d determines whether or not editing of the print label executed at the Step S13 has been finished for all the sheets. Specifically, it is determined whether or not an appropriate operation input such as an "enter" key of the operation portion 118a has been made, for example. If editing has not been finished for all the sheets, the determination at Step S14 is not satisfied (S14: NO), the routine returns to Step S13, and the same step is repeated. If editing has been finished for all the sheets, the determination at Step S14 is satisfied (S14: YES), and the routine proceeds to Step S15.

At Step S15, the CPU 118d stores the print data (of all the sheets) for which editing has been finished at Step S13 in the memory 118e of the terminal 118. This Step S15 corresponds to a first storage processing step described in each claim.

At Step S16, the CPU 118d determines whether or not the wireless flag F1 is one. If it is F1=0 (wired communication connection state), the determination at Step S16 is not satisfied (S16: NO), and the routine proceeds to Step S26. If it is F1=1 (wireless data communication connection state), the determination at Step S16 is satisfied (S16: YES), and the routine proceeds to Step S17 which will be described later.

At Step S26, the CPU 118d incorporates all the print data stored in the memory 118e at the Step S15 in one label production job similarly to the method in the first comparative example described above using FIG. 7 and transmits it to the print label producing apparatus 1 via wired communication. Subsequently, this flow is finished. This Step S26 corresponds to a second data transmission step described in each claim.

On the other hand, at Step S17, the CPU 118d transmits an inquiry signal to the control circuit 110 of the print label producing apparatus 1 via wireless data communication through the communication control portion 118c and obtains the storage capacities of the text memory 117A and the print buffer 117B from the CPU 111, for example (or may obtain them directly from the text memory 117A and the print buffer 117B). This Step S17 corresponds to a capacity obtaining step described in each claim.

Subsequently, at Step S18, the CPU 118d reads out all the print data stored in the memory 118e at the Step S15.

Then, at Step S19, the CPU 118d groups the print data read of the memory 118e at the Step S18 into a plurality of print data groups so that the respective data volumes become not larger than a predetermined storage capacity obtained at the Step S17. At that time, the CPU 118d determines allocation of the print data to be included in each print data group so that the number of print data groups after being grouped becomes the minimum (See FIGS. 12A and 12B described above). This Step S19 corresponds to a data allocation step described in each claim.

Details of the print data allocation processing at the Step S19 will be described in details on the basis of the flowchart in FIG. 14.

Figure 14:
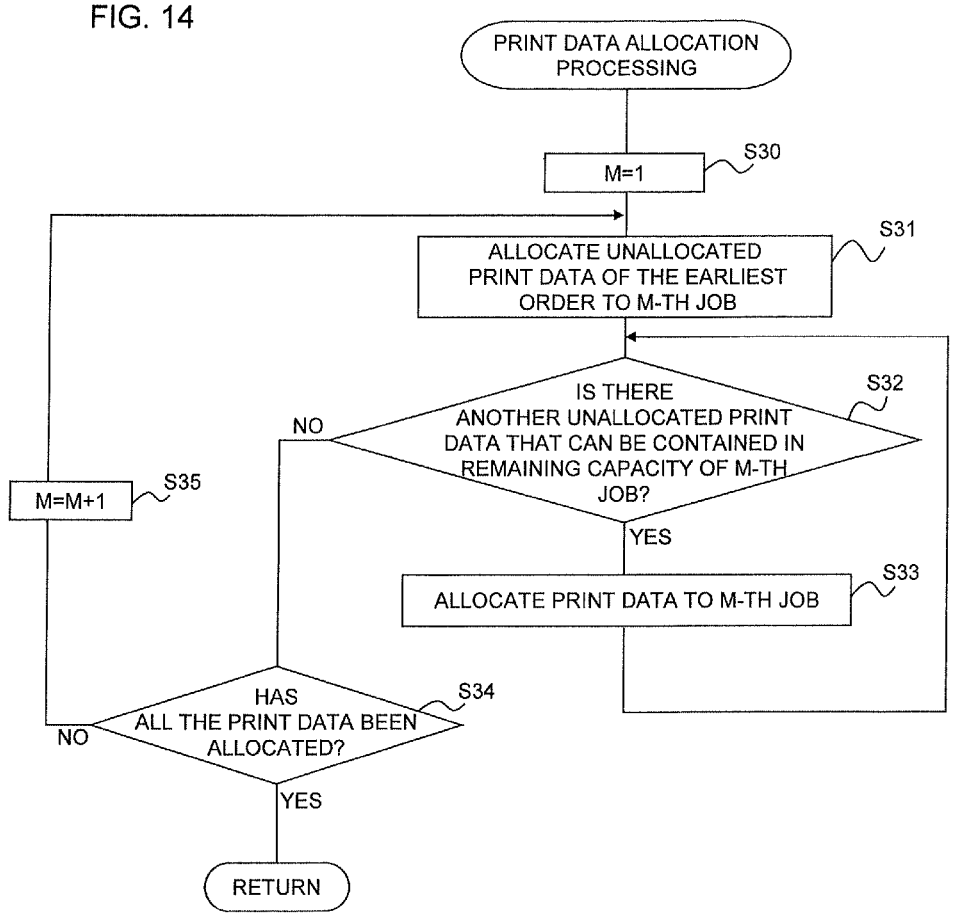
FIG. 14 is a flowchart illustrating details of Step S19 in the flow in FIG. 13.

In FIG. 14, first, at Step S30, the CPU 118d initially sets a variable M indicating a job number of the label production job to one.

Subsequently, at Step S31, the CPU 118d allocates the earliest print data in the arrangement (alignment order) finalized at the Step S13 in the print data of the print labels L not allocated yet at this point of time to the M-th label production job.

Subsequently, at Step S32, the CPU 118d determines whether or not there is another unallocated label which can be contained in a remaining capacity of the M-th job after allocation at the Step S30. If there is no another unallocated label which can be contained in the remaining capacity of the M-th job, the determination at Step S32 is not satisfied (S32: NO), and the routine proceeds to Step S34 which will be described later. If there is another unallocated label which can be contained in the remaining capacity of the M-th job, the determination at Step S32 is satisfied (S32: YES), and the routine proceeds to Step S33.

At Step S33, the CPU 118d allocates the unallocated print data found at the Step S32 to the M-th job. If there is a plurality of pieces of the unallocated print data found at the Step S32, it is only necessary to determine one print data to be allocated in compliance with appropriate regularity (an order from earlier alignment, for example) determined in advance.

A flow from the Step S30 to Step S33 will be specifically described following the example in FIGS. 12A and 12B, for example. The print data "PQR" of the first sheet of the print label L (300 bytes) is allocated to the M-th (M=1) label production job at Step S31. Subsequently, among the print data of the third sheet of the print label L "U", the print data of the fourth sheet of the print label L "V", and the print data of the fifth sheet of the print label L "W" which can be allocated to the remaining 100 bytes, the print data of the third sheet of the print label L "U" having the earliest alignment order is allocated to the M-th (M=1) label production job. As a result, the first label production job having 500 bytes in total in which these two pieces of the print data are grouped and included is produced.

When the Step S33 is finished, the routine returns to Step S32, and the same procedure is repeated.

On the other hand, at Step S34, the CPU 118d determines whether or not allocation of the print data at the Step S31 has been completed for all the print data. If allocation of all the print data has not been completed yet, the determination at Step S34 is not satisfied (S34: NO), and the routine proceeds to Step S35.

At Step S35, the CPU 118d adds one to the variable M. Subsequently, the routine returns to the Step S31, and the same procedure is repeated. As a result, using the example in FIGS. 12A and 12B, for example, the print data of the second sheet of the print label L "ST" (200 bytes) with the earliest order in the unallocated print data is allocated to the M-th (M=2) label production job at Step S31. The print data of the fourth sheet of the print label L "V" is further allocated to the M-th (M=2) label production job at the subsequent Step S32 and Step S33. Subsequently, at Step S32 and Step S33 executed after further returning, the print data of the fifth sheet of the print label L "W" is further allocated to the M-th (M=2) label production job. As a result, the second label production job having 500 bytes in total in which these three pieces of print data are grouped and included is produced.

On the other hand, at the Step S34, if allocation of all the print data has been completed, the determination at Step S34 is satisfied (S34: YES), this routine is finished, and the routine proceeds to Step S20 in FIG. 13 which will be described later.

Returning to FIG. 13, at Step S20, the CPU 118d stores all the print data for which allocation has been finished at the Step S19 in the memory 118e by the unit of label production job (in other words, the unit of print data group). At that time, the print data is stored in the memory 118e so as to be capable of being identified and read for each label production job (in other words, for each print data group) later. This Step S20 corresponds to a second storage processing step described in each claim.

Subsequently, at Step S21, the CPU 118d reads out the print data included in the N-th (first, it is N=1 as described above) label production job in all the print data stored in the memory 118e by the unit of the label production job at the Step S20.

Subsequently, at Step S22, the CPU 118d transmits the print data read at the Step S21 to the print label producing apparatus 1 via the wireless data communication WC through the communication control portion 118c in a form incorporated in the N-th label production job. This Step S19 corresponds to a first data transmission step described in each claim.

Subsequently, at Step S23, the CPU 118d determines whether or not the printing of the print label producing apparatus 1 on the basis of the transmission of the label production job at the Step S22 has been all completed. That is, when printing of all the print data included in the transmitted one label production job is completed, the CPU 111 of the label producing apparatus 1 transmits a print completion signal to the terminal 118 (See Step S280 in FIG. 15 which will be described later). Therefore, at this Step S23, the CPU 118d determines completion of the printing by identifying whether or not the print completion signal has been received. If printing of all the print data of the label production jobs has not been completed, the determination at Step S23 is not satisfied (S23: NO), the routine returns to the Step S21, and the same procedure is repeated. If printing of all the print data of the label production jobs has been completed, the determination at Step S23 is satisfied (S23: YES), and the routine proceeds to Step S24.

At Step S24, the CPU 118d determines whether or not the above described processing for all the label production jobs has been finished. If processing of all the label production jobs has not been finished, the determination at Step S24 is not satisfied (S24: NO), and the routine proceeds to Step S25. At Step S25, the CPU 118d adds one to the variable N and returns to the Step S21, where the same procedure is repeated. By repeating Step S21 to Step S25, the plurality of pieces of print data stored in the memory 118e is read for each print data group (in other words, for each label production job) and sequentially transmitted to the print label producing apparatus 1 as a plurality of jobs corresponding to the plurality of print data groups, respectively.

When processing for all the label production jobs is finished through the repetition, the determination at the Step S24 is satisfied (S24: YES), and this flow is finished.

<Label Production Processing>

Subsequently, label production processing executed by the CPU 111 of the control circuit 110 in the print label producing apparatus 1 through the label production job including the print data from the terminal 118 will be described by referring to FIG. 15.

In FIG. 15, when power of the label producing apparatus 1 is turned on, for example, this flow is started. First, at Step S100, the CPU 111 determines whether or not reception of the label production job (See Step S22 in FIG. 13) transmitted from the terminal 118 has been started. If the label production job has not been received yet, the determination is not satisfied (S100: NO), loop waiting is performed. If reception of one label production job is started, the determination at Step S100 is satisfied (S100: YES), and the routine proceeds to Step S110.

Figure 13:
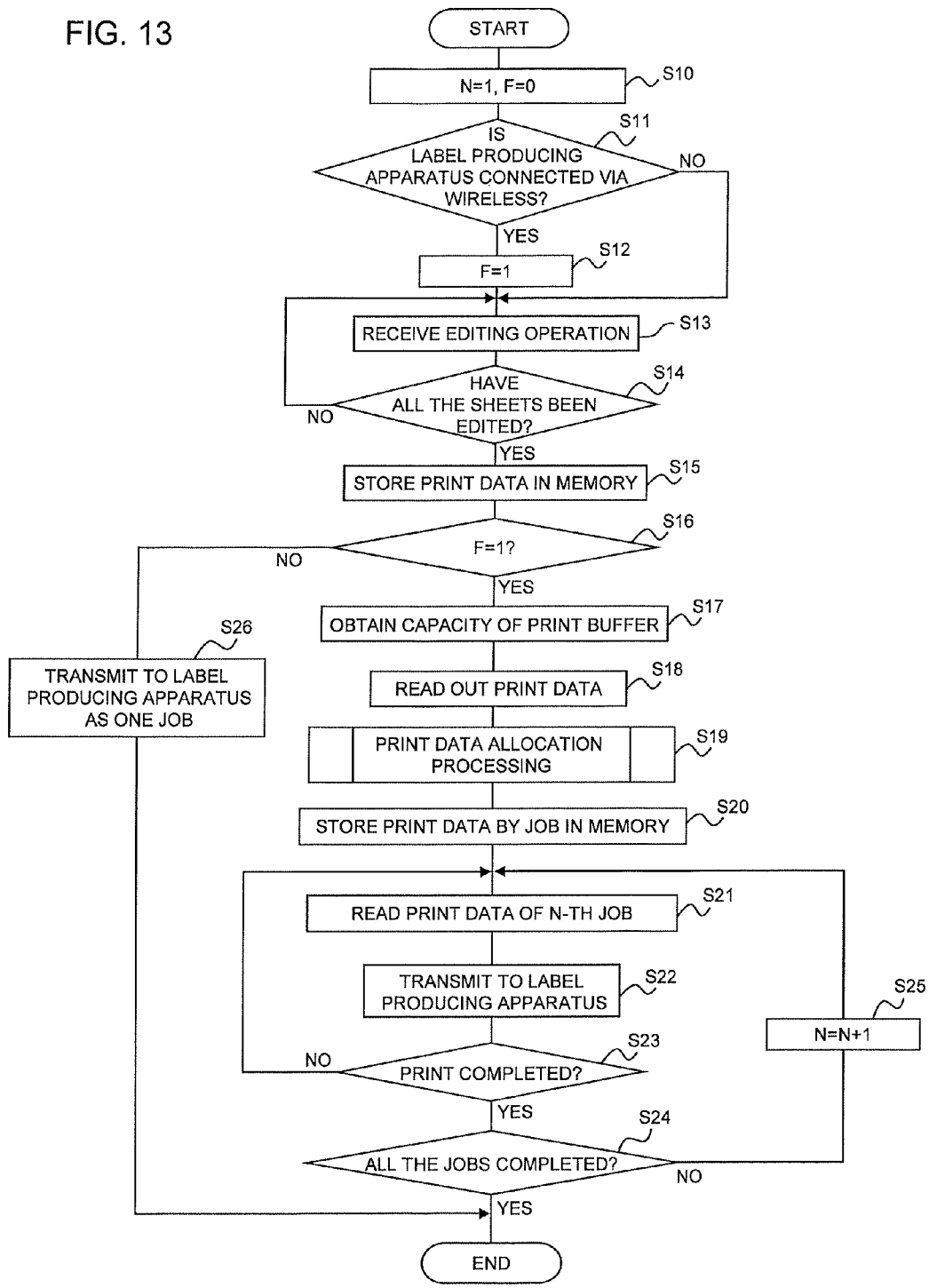
FIG. 13 is a flowchart illustrating control contents executed by an operation terminal.

At Step S110, the CPU 111 detects the contents of the label production job, reception of which has been started at the Step S100 and extracts and obtains one piece of unprocessed print data included in the label production job in the order of reception (in other words, in the alignment order at Step S13 in FIG. 13). Subsequently, the routine proceeds to Step S112.

At Step S112, it is determined whether or not a print start flag F2 (initialized to F2=0 in advance at start of the flow) relating to whether or not to start printing is one. If it is F2=0, the determination is not satisfied (S112: NO), the routine proceeds to Step S120 which will be described later. If it is F2=1, the determination is satisfied (S112: YES), and the routine proceeds to Step S114.

At Step S114, it is determined whether or not a print start command (See FIG. 10 described above) instructing print formation of the print data having been received/extracted at the point of time has been found in the label production job detected at Step S110. If the print start command is not found, the determination is not satisfied (S114: NO), the routine returns to Step S110, and the same procedure is repeated. If the print start command is found, the determination is satisfied (S114: YES), and the routine proceeds to Step S118.

At Step S118, the print start flag F2 is set to F2=1 indicating print start. Subsequently, the routine proceeds to Step S120.

At Step S120, the CPU 111 outputs a control signal to the feeding motor driving circuit 121 through the input/output interface 113 and rotationally drives the feeding roller 27 and the ribbon take-up roller 106 by the driving force of the feeding motor 119. Moreover, the CPU 111 outputs a control signal to the tape discharge motor 65 through the tape discharge motor driving circuit 123 and rotationally drives the driving roller 51. As a result, the base tape 101 is fed out of the first roll 102 and supplied to the feeding roller 27, and at the same time, the cover film 103 is fed out of the second roll 104 and the base tape 101 and the cover film 103 are bonded by the feeding roller 27 and the tape pressure roller 28 and integrated and formed as the label tape 109 with print and fed out to the outside of the cartridge 7 and further to the outside of the label producing apparatus 1.

Subsequently, at Step S130, the CPU 111 determines whether or not the cover film 103 has arrived at a print start position by the print head 23 by an appropriate known method (by counting the number of pulses output by the feeding motor driving circuit 121 driving the feeding motor 119 which is a pulse motor and the like) on the basis of the print data obtained at the Step S110. If the cover film 103 has not arrived at the print start position, the determination at Step S130 is not satisfied (S130: NO), loop waiting is performed until the determination is satisfied. If the cover film 103 has arrived at the print start position, the determination at Step S130 is satisfied (S130: YES), and the routine proceeds to Step S140.

At Step S140, the CPU 111 outputs a control signal to the print-head driving circuit 120 through the input/output interface 113, electrifies the print head 23 and starts printing of the label print R such as a character, a symbol, and a barcode corresponding to the print data obtained at Step S110 on the above described print area S in the cover film 103.

Subsequently, the routine proceeds to Step S150, and the CPU 111 determines whether or not the label tape 109 with print has been fed to a print end position on the basis of the print data. The determination at this time can be also detected by a known method similarly to the above. If the label tape 109 with print has not arrived at the print end position yet, the determination at Step S150 is not satisfied (S150: NO), loop waiting is performed until the determination is satisfied. If the label tape 109 with print has arrived at the print end position, the determination at Step S150 is satisfied (S150: YES), the routine proceeds to Step S160.

At Step S160, the CPU 111 outputs a control signal also to the print-head driving circuit 120 through the input/output interface 113, stops power feeding to the print head 23 and stops printing of the label print R. As a result, printing of the label print R on the print area S on the one sheet of the print label L is completed. Subsequently, the routine proceeds to Step S170.

At Step S170, the CPU 111 determines whether or not cut setting of the rear end portion in the print label L having been produced at this point of time is full cut on the basis of the print data obtained at the Step S110. Specifically, it is determined whether or not the cutting flag (See FIG. 10), not a half cutting flag, is included in the label production job whose contents were detected at Step S110. If it is the cutting flag, the determination at Step S170 is satisfied (S170: YES), and the routine proceeds to Step S220.

At Step S220, the CPU 111 determines whether or not the label tape 109 with print has been fed to a full cut position located on the rear end portion of the print label L (at the boundary with the print label L subsequent to the print label L in the feeding direction) by a known method similar to the Step S130 on the basis of the print data obtained at the Step S110. In other words, the CPU 111 determines whether or not the label tape 109 with print has arrived at a position where the movable blade 41 of the cutting mechanism 15 faces the full cut line CL on the label tape 109 with print. If the label tape 109 with print has not arrived at the full cut position, the determination at Step S220 is not satisfied (S220: NO), loop waiting is performed until the determination is satisfied. If the label tape 109 with print has arrived at the full cut position, the determination at Step S220 is satisfied (S220: YES), and the routine proceeds to Step S230.

At Step S230, the CPU 111 outputs a control signal to the feeding motor driving circuit 121 and the tape discharge motor driving circuit 123 through the input/output interface 113, stops driving of the feeding motor 119 and the tape discharge motor 65 and stops rotation of the feeding roller 27, the ribbon take-up roller 106, and the driving roller 51. As a result, during the course in which the label tape 109 with print fed out of the cartridge 7 moves in the discharge direction, while the movable blade 41 of the cutting mechanism 15 faces the full cut line CL of the print label L, the feeding-out of the base tape 101 from the first roll 102, feeding-out of the cover film 103 from the second roll 104, and feeding of the label tape 109 with print are stopped.

Subsequently, at Step S240, the CPU 111 outputs a control signal to the cutter motor driving circuit 122 so as to drive the cutter motor 43, rotationally moves the movable blade 41 of the cutting mechanism 15, and executes full cut processing for cutting (=full cut) all the cover film 103, the adhesive layer 101a, the base film 101b, the adhesive layer 101c, and the separation sheet 101d of the label tape 109 with print and for forming the full cut line CL. By means of this cutting by the cutting mechanism 15, one print label L is produced by being separated from the label tape 109 with print.

Subsequently, the routine proceeds to Step S250, and the CPU 111 outputs a control signal to the feeding motor driving circuit 121 and the tape discharge motor driving circuit 123 through the input/output interface 113 and resumes feeding of the label tape 109 with print by rotationally driving the feeding roller 27, the ribbon take-up roller 106, and the driving roller 51. As a result, feeding by the driving roller 51 is started, and the print label L produced as above is fed toward the label discharging exit 11 and is discharged to the outside of the label producing apparatus 1 through the label discharging exit 11. Subsequently, the routine proceeds to Step S260.

At Step S260, the CPU 111 determines whether or not production of all the print labels L corresponding to all the print data included in portions for which reception has been completed at this point of time in the label production jobs, reception of which had been started at the Step S100. If production of all the print labels L for which reception of the print data has been completed at this point of time is not finished yet, the determination at Step S260 is not satisfied (S260: NO), the routine returns to Step S110, and the same procedure is repeated. If production of all the print labels L for which reception of the print data has been completed is finished at this point of time, the determination at Step S260 is satisfied (S260: YES), and the routine proceeds to Step S270.

At Step S270, it is determined whether or not reception of the label production job started at Step the S100 has been completed. If reception of the label production job has not been completed, the determination at Step S270 is not satisfied (S270: NO), the routine returns to Step S110, and the same procedure is repeated. If reception of the label production job has been completed, the determination at Step S270 is satisfied (S270: YES), and the routine proceeds to Step S280.

At Step S280, a print completion signal indicating that production of all the print labels L corresponding to one label production job, reception of which had been started at Step S110, is completed is transmitted to the terminal 118 through the communication control portion 240, and this flow is finished.

On the other hand, at Step S170, if cut setting on the rear end portion of the print label L being produced at this point of time is not full cut but half cut (specifically, the half cutting flag is included in the label production job whose contents is detected at Step S110), the determination at the Step S170 is not satisfied (S170: NO), and the routine proceeds to Step S180.

At Step S180, the CPU 111 determines whether or not the label tape 109 with print has been fed to the half cut position located on the rear end portion of the print label L (at the boundary with the print label L subsequent to the print label L in the feeding direction) by a known method similar to the Step S130 on the basis of the print data obtained at the Step S110. In other words, the CPU 111 determines whether or not the label tape 109 with print has arrived at a position where the half cutter 34 of a half cutting mechanism 35 faces the half cut line HC. If the label tape 109 with print has not arrived at the half cut position, the determination at Step S180 is not satisfied (S180: NO), and loop waiting is performed until the determination is satisfied. If the label tape 109 with print has arrived at the half cut position, the determination at Step S180 is satisfied (S180: YES), and the routine proceeds to Step S190.

At Step S190, the CPU 111 stops rotation of the feeding roller 27, the ribbon take-up roller 106, and the driving roller 51 similarly to the Step S230 and stops feeding of the label tape 109 with print. As a result, in a state where the half cutter 34 of the half cutting mechanism 35 faces the half cut line HC of the print label L, the feeding-out of the base tape 101 from the first roll 102, feeding-out of the cover film 103 from the second roll 104, and feeding of the label tape 109 with print are stopped.

Subsequently, at Step S200, the CPU 111 outputs a control signal to the half cutter motor driving circuit 128 through the input/output interface 113 and drives the half cutter motor 129, rotationally moves the half cutter 34, and executes half cut processing of cutting (=half cut) the cover film 103, the adhesive layer 101a, the base film 101b, and the adhesive layer 101c of the label tape 109 with print and of forming the half cut line HC. By means of this cutting by the half cut unit 35, one print label L (in a state not cut away from but connected to the label tape 109 with print on the rear end side in the feeding direction) is produced. Subsequently, the routine proceeds to Step S210.

At Step S210, the CPU 111, similarly to the Step 250, outputs a control signal to the tape discharge motor driving circuit 123 through the input/output interface 113, resumes driving of the tape discharge motor 65, and rotates the driving roller 51. As a result, feeding by the driving roller 51 is started, and the print label L produced as above is fed toward the label discharging exit 11 and is discharged to the outside of the label producing apparatus 1 through the label discharging exit 11 (however, in the state where the rear end side in the feeding direction is still connected to the label tape 109 with print as described above). Subsequently, the routine returns to the Step S110, and the same procedure is repeated.

After Step S100 is gone through by means of the above described control, Step S110 to Step S270 are repeated, the print labels L including the label print R, respectively, corresponding to all the print data included in one label production job are sequentially produced, and finally, all the (at least one) print labels L whose production was instructed in the label production job received at the Step S110 is produced.

The present disclosure is not limited to the above described embodiment but is capable of various modifications within a range not departing from the gist thereof. Such modifications will be described below in order.

(1) When Allocation is Made so that Print Data in Similar Print Mode Continues:

In the present modification, when the plurality of pieces of print data is grouped as described above and allocated to each print data group (in other words, each print production job), those with print modes such as contrasting density or the like, for example, similar to each other are arranged in the same data group and continuously. That is, the CPU 118d of the terminal 118 determines allocation of print data so that a plurality of pieces of print data each with print contents satisfying a predetermined mode condition (the maximum on-dot number of the heat generating elements of the print head 23 on the basis of the print data is not less than or not more than a predetermined number, for example) is produced in one and common print data group (in other words, the same label production job) and continuously.

Figure 16A:
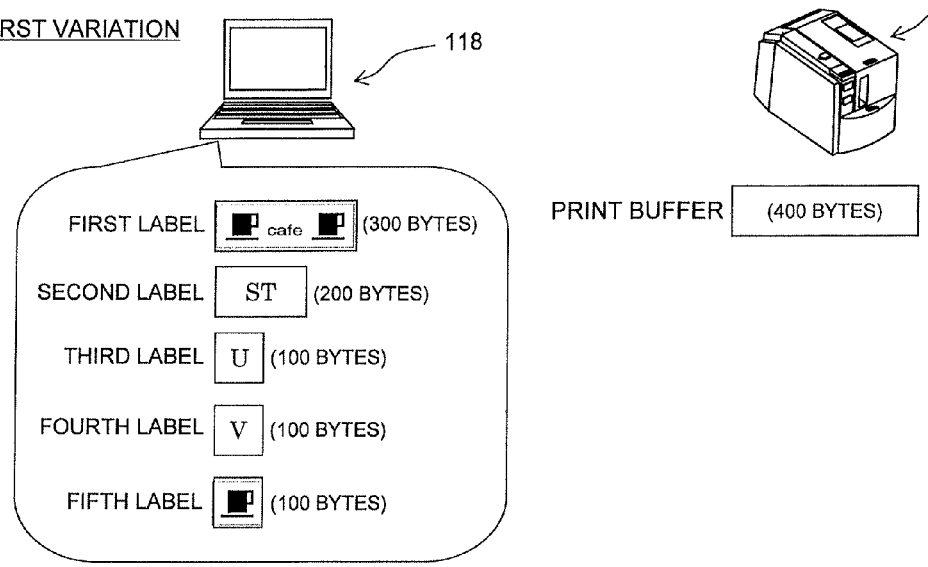
FIG. 16A is an explanatory diagram for explaining a modification in which allocation is made so that the print data in the similar print mode continues.

In an example illustrated in FIG. 16A, for example, print data (data volume is 300 bytes, for example) for producing the first sheet of the print label L including the label print R of "two black-painted coffee cup marks"+"café", the print data (data volume is 200 bytes, for example) for producing the second sheet of the print label L including the label print R "ST", the print data (data volume is 100 bytes, for example) for producing the third sheet of the print label L including the label print R "U", the print data (data volume is 100 bytes, for example) for producing the fourth sheet of the print label L including the label print R "V", and the print data (data volume is 100 bytes, for example) for producing the fifth sheet of the print label L including the label print R "one black-painted coffee cup mark" are produced in the terminal 118 and arranged in this order (equal to the production order in the feeding direction of the label tape 109 with print).

Figure 16B:
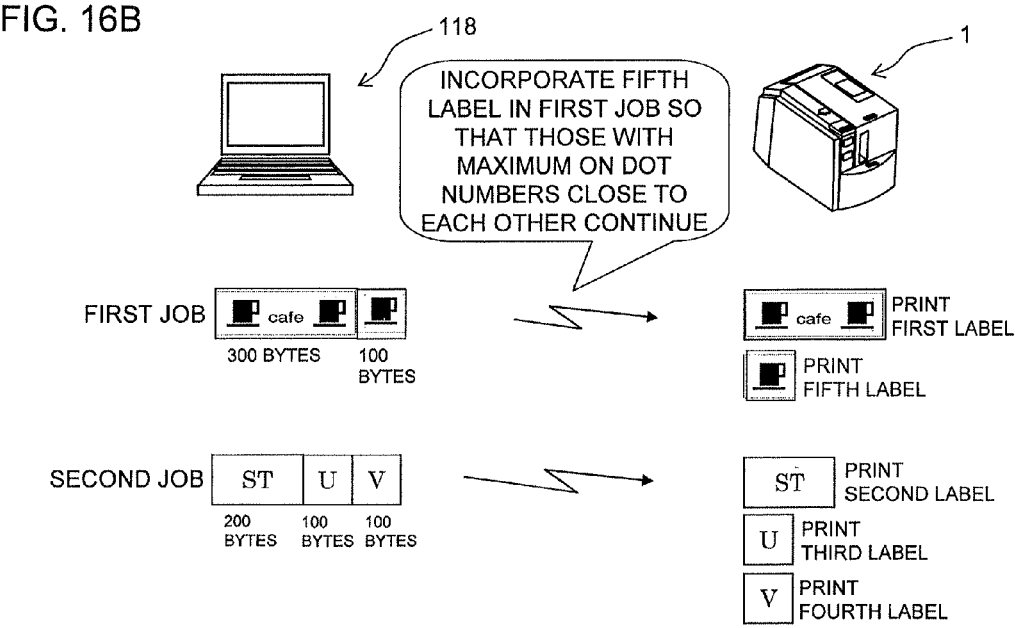
FIG. 16B is an explanatory diagram for explaining the modification in which allocation is made so that the print data in the similar print mode continues.

In the above case, in the present modification, as illustrated in FIG. 16B, first, the print data (data volume is 300 bytes) of the first sheet of the print label L including the label print R of "two black-painted coffee cup marks"+"café" is incorporated in the first label production job. Subsequently, among the three pieces of the print data, that is, the print data "U" (data volume is 100 bytes), the print data "V" (data volume is 100 bytes), and the print data "one black-painted coffee cup mark" (data volume is 100 bytes) matching the remaining data volume of 100 bytes, the print data of the fifth sheet of the print label L "one black-painted coffee cup mark" having the maximum on-dot number (corresponding to the painted area of the black-painted coffee cup mark) substantially equal to the print data of the first sheet of the print label L is selected and incorporated in the first label production job.

Subsequently, the remaining print data (data volume is 200 bytes) of the second sheet of the print label L including the label print R "ST", print data (data volume is 100 bytes) of the third sheet of the print label L including the label print R "U", and print data (data volume is 100 bytes) of the fourth sheet of the print label L including the label print R "V" are incorporated in the second label production job.

(2) When Allocation is Made so that Print Data with Similar Applications and the Like are in the Same Group:

In the present modification, when a plurality of pieces of the print data is grouped and allocated to each print data group (in other words, each label production job) as described above, those with applications in common such as "name tag" and "equipment management" are grouped in the same data group. That is, the CPU 118d of the terminal 118 determines allocation of the print data so that the plurality of pieces of data satisfying a predetermined similarity condition (the application indicated by the label print R is the same or similar as above, for example) is included in one and common print data group (in other words, the same label production job), for example.

Figure 17A:
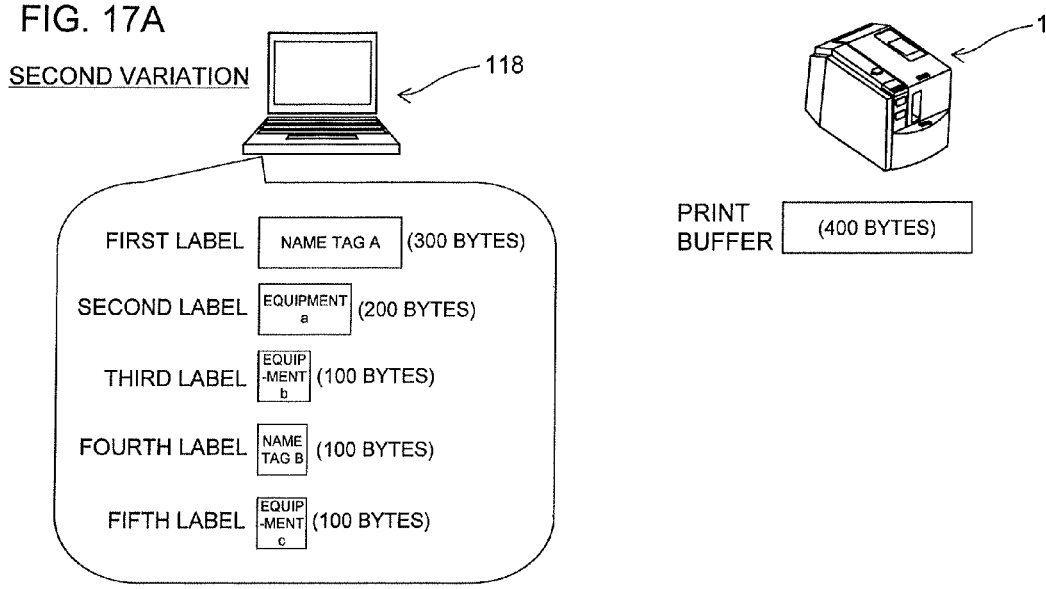
FIG. 17A is an explanatory diagram for explaining a modification in which allocation is made so that the print data with similar applications or the like is grouped into the same group.

In an example illustrated in FIG. 17A, for example, the print data (data volume is 300 bytes, for example) for producing the first sheet of the print label L including the label print R "name tag A", the print data (data volume is 200 bytes, for example) for producing the second sheet of the print label L including the label print R "equipment a", the print data (data volume is 100 bytes, for example) for producing the third sheet of the print label L including the label print R "equipment b", the print data (data volume is 100 bytes, for example) for producing the fourth sheet of the print label L including the label print R "name tag B", and the print data (data volume is 100 bytes, for example) for producing the fifth sheet of the print label L including the label print R "equipment c" are produced in the terminal 118 and arranged in this order (equal to the production order in the feeding direction of the label tape 109 with print).

Figure 17B:
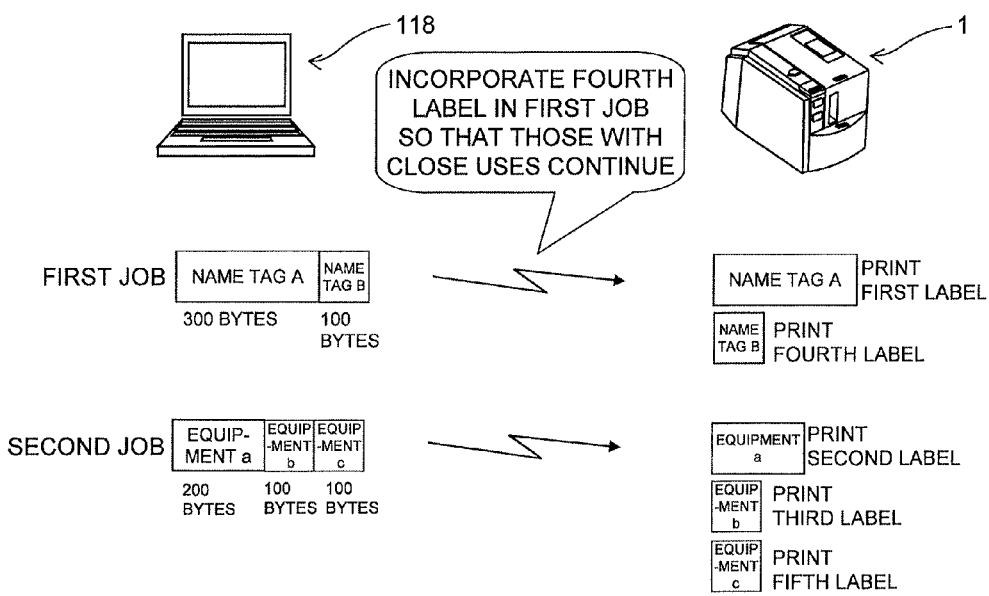
FIG. 17B is an explanatory diagram for explaining the modification in which allocation is made so that the print data with similar applications or the like is grouped into the same group.

In the above case, in the present modification, as illustrated in FIG. 17B, first, the print data (data volume is 300 bytes) of the first sheet of the print label L including the label print R "name tag A" is incorporated in the first label production job. Subsequently, among the three pieces of the print data, that is, the print data "equipment b" (data volume is 100 bytes) matching the remaining data volume of 100 bytes, the print data "name tag B" (data volume is 100 bytes), and the print data "equipment c" (data volume is 100 bytes), the print data of the fourth sheet of the print label L "name tag B" with the application (=for name tag production) in common with the print data "name tag A" is selected and incorporated in the first label production job.

Subsequently, the remaining print data (data volume is 200 bytes) of the second sheet of the print label L including the label print R "component a", print data (data volume is 100 bytes) of the third sheet of the print label L including the label print R "equipment b", and print data (data volume is 100 bytes) of the fifth sheet of the print label L including the label print R "equipment c" are incorporated in the second label production job.

(3) Others

The present disclosure can be also applied to a case in which the print label producing apparatus 1 is driven by a battery and is particularly effective. That is, when the print label producing apparatus 1 is driven by a battery, the larger the tendency of discontinuity in the producing operation of the print label L is, the more the battery is exhausted, and use for a long time becomes difficult. Exhaustion of the battery can be particularly reduced by improving continuity of the producing operation of the print label L as described above.

In the above, such a method is used that print is applied on the cover film 103 different from the base tape 101 and they are bonded together, but the present disclosure is not limited thereto and may be applied to a method (not bonding type) in which print is applied on a print-receiving tape layer provided on the base tape. Moreover, the case in which the label tape 109 with print is produced by the base tape 101 including the adhesive layer 101c, and the print label L as a printed matter is produced by using it is described as an example, but the present disclosure is not limited thereto. That is, the present disclosure may be applied to a printed matter producing apparatus using a paper tape without an adhesive surface or a roll-shaped printing sheet by cutting it to an appropriate length, and to an operation terminal operating the printed matter producing apparatus. In this case, one page of the paper tape or printing sheet corresponds to one printed matter described in each claim. In this case, too, the same effect can be obtained.

In the above, the arrows illustrated in FIG. 4 and the like indicate examples of flows of signals and do not limit the flow directions of the signals.

Moreover, the flowcharts illustrated in FIGS. 13, 14, and 15 are not intended to limit the present disclosure to the steps illustrated in the above described flows but addition/deletion or change of order and the like of the steps may be made within a range not departing from the gist and technical idea of the present disclosure.

Moreover, other than those described above, methods of the above described embodiment and the modifications may be used in combination as appropriate.

Besides the above, though not individually exemplified, the present disclosure is put into practice with various changes added within a range not departing from the gist thereof.

What is claimed is:

1. A non-transitory computer-readable recording medium, storing a printed matter production program for executing steps on a computing portion provided in an operation terminal for operating, by using wireless data communication, a printed matter producing apparatus that includes a storage portion having a predetermined storage capacity and be configured to store print data; a feeder configured to feed a print-receiving medium, and a print head configured to perform printing on the basis of the print data stored in said storage portion on said print-receiving medium fed by said feeder, the printed matter producing apparatus being configured to continuously produce a plurality of printed matters in which desired print on the basis of said print data is formed, respectively, on said print-receiving medium in a predetermined order along a feeding direction by said feeder, said steps comprising:

a first storage processing step for obtaining a plurality of pieces of said print data for producing said plurality of printed matters in said predetermined order along said feeding direction, respectively, and for storing the print data in a memory;

a capacity obtaining step for obtaining said predetermined storage capacity of said storage portion of said printed matter producing apparatus;

a data allocation step for grouping said plurality of pieces of print data stored in said memory in said first storage processing step into a plurality of print data groups, respectively, so that each data volume is not more than said predetermined storage capacity obtained in said capacity obtaining step and for determining allocation of said print data to be included in each print data group so that the number of said print data groups after the grouping becomes the minimum;

a second storage processing step for storing, in the memory, said plurality of pieces of print data for which allocation in said data allocation step is finished so that they can be identified and read for each print data group; and a first data transmission step for reading said plurality of pieces of print data stored in the memory in said second storage processing step for each print data group and for sequentially transmitting the print data to said printed matter producing apparatus as a plurality of printing instructions corresponding to the plurality of print data groups, respectively wherein said steps further comprises a determination step for determining whether the operation terminal is connected to said printed matter producing apparatus via said wireless data communication or whether the operation terminal is connected to said printed matter producing apparatus via wired communication, wherein a second data transmission step for transmitting said plurality of pieces of print data stored in said memory in said first storage processing step to said printed matter producing apparatus via the wired communication is executed by said computing portion when it is determined in said determination step that said operation terminal is connected to said printed matter producing apparatus via said wired communication, and said capacity obtaining step, said first storage processing step, said data allocation step, said second storage processing step, and said first data transmission step are executed by said computing portion when it is determined in said determination said that said operation terminal is connected to said printed matter producing apparatus via said wireless data communication.

2. The recording medium according to claim 1, wherein:
in said data allocation step, allocation of the print data is determined so that a plurality of pieces of the print data each having print contents satisfying predetermined mode conditions is aligned in a continuous order along said feeding direction in one and common said print data group.

3. The recording medium according to claim 1, wherein:
in said data allocation step, allocation of the print data is determined so that a plurality of pieces of the print data corresponding to a plurality of said printed matters mutually satisfying predetermined similarity conditions, respectively, is included in the one and common print data group.

4. The recording medium according to claim 1, wherein:
each of said plurality of printing instructions transmitted in said first data transmission step includes:
an initialization command for initializing data stored in advance in said storage portion of said printed matter producing apparatus;
a plurality of pieces of said print data stored in said storage portion after the initialization by said initialization command and included in said one print data group corresponding to the printing instruction; and
a print start command for causing said print head to start print formation on the basis of the plurality of pieces of print data.

5. The recording medium according to claim 4, wherein:
the program is executed by said computing portion of said operation terminal for operating said printed matter producing apparatus having a cutter configured to cut said print-receiving medium on which printing is performed by said print head; and
each of said plurality of printing instructions includes at least one cutting instruction for causing said cutter to execute cutting of said print-receiving medium.

6. The recording medium according to claim 1, wherein:
the program is executed by said computing portion of said operation terminal for operating said printed matter producing apparatus driven by a battery.

7. A printed matter producing method executed by an operation terminal for operating, by using wireless data communication, a printed matter producing apparatus that includes: a storage portion having a predetermined storage capacity and be configured to store print data; a feeder configured to feed a print-receiving medium, and a print head configured to perform printing on the basis of the print data stored in said storage portion on said print-receiving medium fed by said feeder, the printed matter producing apparatus being configured to continuously producing a plurality of printed matters in which desired print on the basis of said print data is formed, respectively, on said print-receiving medium in a predetermined order along a feeding direction by said feeder, the printed matter producing method comprising the steps of:

a first storage processing step for obtaining a plurality of pieces of said print data for producing said plurality of printed matters in said predetermined order along said feeding direction, respectively, and for storing the print data in a memory;

a capacity obtaining step for obtaining said predetermined storage capacity of said storage portion of said printed matter producing apparatus;

a data allocation step for grouping said plurality of pieces of print data stored in said memory in said first storage processing step into a plurality of print data groups, respectively, so that each data volume is not more than said predetermined storage capacity obtained in said capacity obtaining step and for determining allocation of said print data to be included in each print data group so that the number of said print data groups after the grouping becomes the minimum;

a second storage processing step for storing, in the memory, said plurality of pieces of print data for which allocation in said data allocation step is finished so that they can be identified and read for each print data group; and a first data transmission step for reading said plurality of pieces of print data stored in the memory in said second storage processing step for each print data group and for sequentially transmitting the print data to said printed matter producing apparatus as a plurality of printing instructions corresponding to the plurality of print data groups, respectively wherein said steps further comprises a determination step for determination whether the operation terminal is connected to said printed matter producing apparatus via said wireless data communication or whether the operation terminal is connected to said printer matter producing apparatus via wired communication, wherein a second data transmission step for transmitting said plurality of pieces of print data stored in said memory in said first storage processing step to said printed matter producing apparatus via the wired communication is executed by said operation terminal when it is determined in said determination step that said operation terminal is connected to said printed matter producing apparatus via said wired communication, and said capacity obtaining step, said first storage processing step, said data allocation step, said second storage processing step, and said first transmission step are executed by said operation terminal when it is determined in said determination step that said operation terminal is connected to said printed matter producing apparatus via said wireless data communication.

* * * * *